(12) United States Patent
Kasuya

(10) Patent No.: US 7,458,367 B2
(45) Date of Patent: Dec. 2, 2008

(54) CANISTER

(75) Inventor: Kazusato Kasuya, Obu (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 0 days.

(21) Appl. No.: 11/730,396

(22) Filed: Apr. 2, 2007

(65) Prior Publication Data

US 2007/0227361 A1 Oct. 4, 2007

(30) Foreign Application Priority Data

Mar. 31, 2006 (JP) ............................. 2006-097383

(51) Int. Cl.
*F02M 33/02* (2006.01)
(52) U.S. Cl. ........................................ 123/519; 96/149
(58) Field of Classification Search ................. 123/516, 123/518–520; 96/132, 135, 144, 149
See application file for complete search history.

(56) References Cited

U.S. PATENT DOCUMENTS

| | | | | |
|---|---|---|---|---|
| 4,386,947 A * | 6/1983 | Mizuno et al. ................. 96/137 |
| 4,496,379 A * | 1/1985 | Kozawa ......................... 96/130 |
| 4,598,686 A * | 7/1986 | Lupoli et al. ................. 123/519 |
| 4,766,872 A * | 8/1988 | Kato et al. ................... 123/519 |
| 5,098,453 A * | 3/1992 | Turner et al. .................. 96/149 |
| 5,282,962 A * | 2/1994 | Chen ...................... 210/167.25 |
| 5,304,235 A * | 4/1994 | Watanabe et al. .............. 96/144 |
| 5,538,542 A * | 7/1996 | Watanabe et al. .............. 96/131 |
| 5,538,543 A * | 7/1996 | Watanabe et al. .............. 96/131 |
| 5,632,251 A * | 5/1997 | Ishikawa ..................... 123/519 |
| 5,632,808 A * | 5/1997 | Hara et al. .................... 96/137 |
| 5,645,036 A * | 7/1997 | Matsumoto et al. ......... 123/519 |
| 5,718,209 A * | 2/1998 | Scardino et al. ............. 123/519 |
| 5,743,943 A * | 4/1998 | Maeda et al. ................. 96/126 |
| 5,776,228 A * | 7/1998 | Meiller et al. ................. 96/134 |
| 6,503,301 B2* | 1/2003 | Uchino et al. ................. 96/132 |
| 6,551,388 B1* | 4/2003 | Oemcke et al. ............... 96/149 |
| 6,695,896 B2* | 2/2004 | Hara et al. .................... 96/121 |
| 6,935,318 B2* | 8/2005 | Abidi et al. ................. 123/519 |
| 2001/0039881 A1* | 11/2001 | Moriyama et al. ............ 96/139 |
| 2002/0026874 A1* | 3/2002 | Ikuma et al. .................. 96/144 |
| 2002/0078931 A1* | 6/2002 | Makino et al. .............. 123/519 |
| 2004/0261773 A1* | 12/2004 | Abidi et al. ................. 123/519 |
| 2005/0022796 A1* | 2/2005 | Zuchara ...................... 123/519 |
| 2005/0039603 A1 | 2/2005 | Matsuura et al. |

FOREIGN PATENT DOCUMENTS

| | | |
|---|---|---|
| JP | 08 319906 | 12/1996 |
| JP | 2000 064916 | 3/2000 |
| JP | 2002 048016 | 2/2002 |
| WO | 01 98650 | 12/2001 |

* cited by examiner

*Primary Examiner*—Thomas N Moulis
(74) *Attorney, Agent, or Firm*—Dennison, Schultz & MacDonald

(57) ABSTRACT

A canister is taught that includes a container 10 containing granular adsorbent materials 30 that can adsorb fuel vapor generated from a fuel tank, and a plate-shaped dividing member 40, 45, 48, 65 and 72 that is disposed in the container 10 in order to carry the adsorbent materials 30. The dividing member 40, 45, 48, 65 and 72 is formed with a large number of elongated ventilating holes 60 and 68 for flowing the fuel vapor. Each of the ventilating holes 60 and 68 has an opening length 60L larger than a length 30L of the adsorbent materials 30 and an opening width 60w that can restrict passage of the adsorbent materials 30.

26 Claims, 20 Drawing Sheets

CANISTER

BACKGROUND OF THE INVENTION

The present invention relates to a canister which is mainly used in a vehicle, such as an automobile. In particular, the present invention relates to a canister which can adsorb vaporized fuel generated in a fuel system.

In a vehicle, a canister is generally used in order to adsorb fuel vapor (which is called evaporation gas, purged gas or vaporized gas) generated in the fuel system.

For example, Japanese Laid-open Patent Publication Number 2000-64916 teaches a canister. As shown in FIG. 36, the canister includes a case 111. The case 111 has a first adsorbent layer 112a and a second adsorbent layer 112b that are separated from each other by a vertical dividing wall 115 disposed therein. Each of the adsorbent layer 112a and the adsorbent layer 112b is composed of granular adsorbent materials (not shown) that can adsorb fuel vapor.

The case 111 has a first space chamber 121a that is positioned on the first adsorbent layer 112a. The first space chamber 121a is communicated with an inlet port 122 and a purge port 123 that are formed in the case 111. The inlet port 122 communicates with a fuel tank (not shown), and the purge port 123 communicates with an intake pipe of an engine (not shown). The first adsorbent layer 112a and the first space chamber 121a are separated from each other by a gas permeable filter 113a. Conversely, the case 111 has a second space chamber 121b that is positioned on the second adsorbent layer 112b. The second space chamber 121b is communicated with an atmosphere port 124. The atmosphere port 124 is opened to an atmosphere. The second adsorbent layer 112b and the second space chamber 121b are separated from each other by a gas permeable filter 113b.

The case 111 has a communication chamber 125 that is positioned under the first and second adsorbent layers 112a and 112b. The first and second adsorbent layers 112a and 112b and the communication chamber 125 are respectively separated from each other by gas permeable filters 114a and 114b. The filters 114a and 114b are respectively supported by grids 116a and 116b having ventilating holes 117. The grids 116a and 116b are respectively equipped with plate spring portions 118 and 120 that can press the grids 116a and 116b against the adsorbent layers 112a and 112b. The filters 113a, 113b, 114a and 114b are respectively formed from pad members that are made of a fibrous material or other such materials.

In the canister thus constructed, under a condition in which the engine is stopped, for example, when fuel is supplied to the engine, fuel vapor generated in the fuel tank flows into the first space chamber 121a through the inlet port 122. The fuel vapor flows through the first adsorbent layer 112a, the communication chamber 125 and the second adsorbent layer 112b with air, so as to be adsorbed by the adsorbent materials in the adsorbent layers 112a and 112b. Then, the air in which the fuel vapor is substantially removed is discharged into the atmosphere from the second space chamber 121b through the atmosphere port 124.

To the contrary, during operation of the engine, negative pressure generated in the intake pipe acts on an interior of the first space chamber 121a through the purge port 123. Due to the negative pressure, the fuel vapor that has been adsorbed to the adsorbent layers 112a and 112b is purged to the engine through the purge port 123. At this time, atmospheric air flows into the second space chamber 121b through the atmosphere port 124.

BRIEF SUMMARY OF THE INVENTION

It is an object of the present invention to provide an improved canister.

For example, in one aspect of the present invention, a canister is taught that includes a container containing granular adsorbent materials that can adsorb fuel vapor generated from a fuel tank, and a plate-shaped dividing member that is disposed in the container in order to carry the adsorbent materials. The dividing member is formed with a large number of elongated ventilating holes for flowing the fuel vapor. Each of the ventilating holes has an opening length larger than a length of the adsorbent materials and an opening width that can restrict passage of the adsorbent materials.

According to the canister, the granular adsorbent materials received in the container can be carried by the dividing plate. Further, because the ventilating holes have a predetermined dimension, the adsorbent materials can be prevented from passing through the ventilating holes. Further, the ventilating holes can be prevented from being clogged by the adsorbent materials.

In addition, the dividing plate has a function of grids and a function of filters in a conventional canister. Thus, according to the canister, the number of the construction elements can be effectively reduced than the conventional canister.

DETAILED DESCRIPTION OF THE INVENTION

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

Detailed representative embodiments of the present invention are shown in FIG. 1 to FIG. 35.

First Detailed Representative Embodiment

A first detailed representative embodiment of the present invention is shown in FIGS. 1 to 4.

Figure 1:
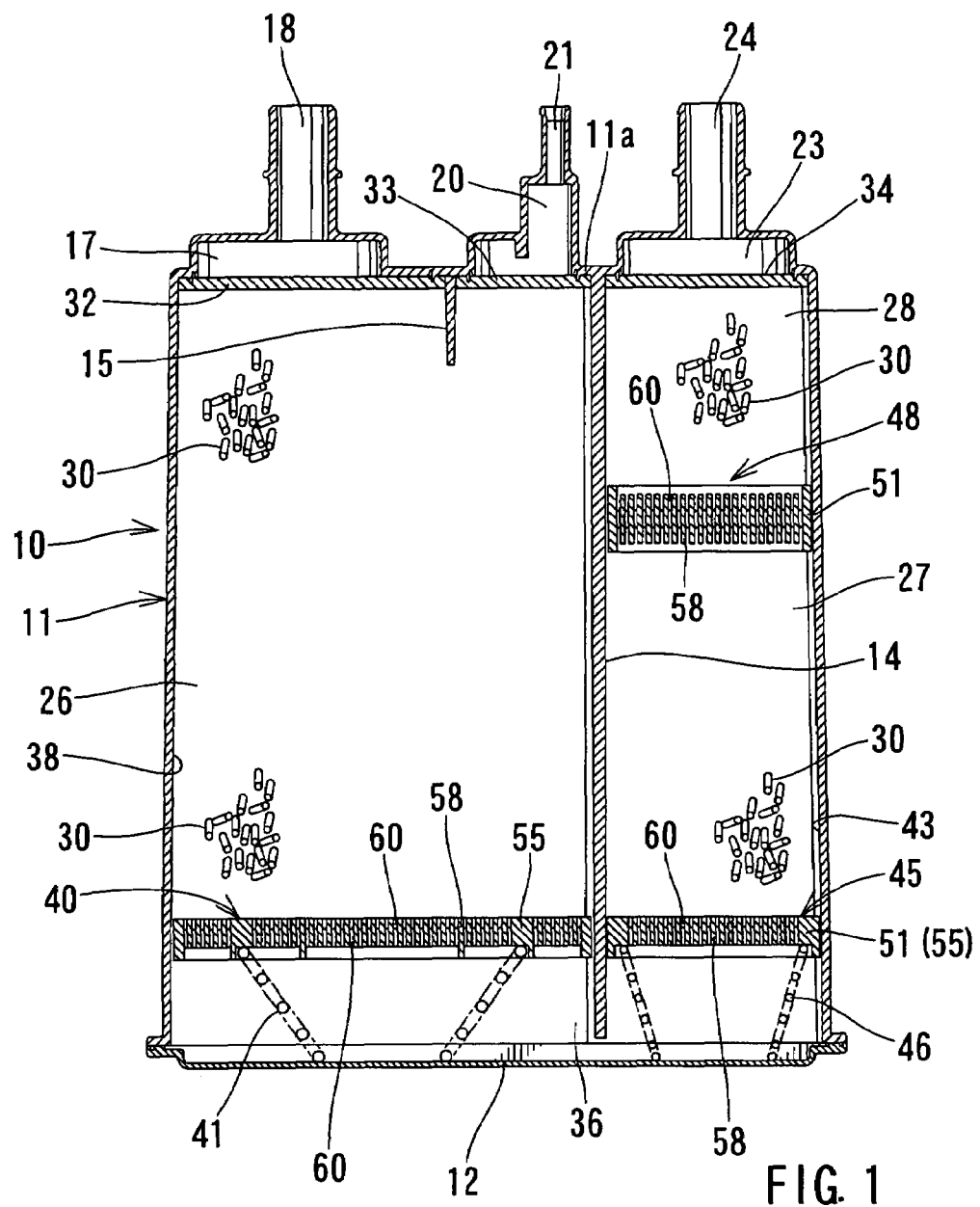
FIG. 1 is a vertical sectional view of a canister according to a first embodiment of the present invention.

As shown in FIG. 1, a canister includes a resin case (i.e., container) 10. The case 10 includes a box-like case main body 11 having a lower opening, and a cover plate (closure plate) 12. The cover plate is bonded to a lower side of the case main body 11 by fusion-bonding or other such bonding methods, so as to close the lower opening of the case main body 11. The case main body 11 is provided with a dividing wall 14 that downwardly extends from an upper plate portion 1 a of the main body 11 toward the cover plate 12. The dividing wall 14 may preferably divide an interior of the case main body 11 into two or right and left inner spaces or cavities (i.e., first and second inner spaces or cavities).

The portion of the upper plate portion 11a corresponding to the first inner space (i.e., the left-hand side space in FIG. 1) of the case main body 11 is provided with a dividing wall 15. The dividing wall 15 downwardly protrudes such that the upper space of the first inner space into two or right and left spaces (i.e., first and second upper inner spaces). The first upper inner space (the left-hand side space in FIG. 1) is formed as an introduction chamber 17. The case main body 11 is formed with an introduction port 18, so that the introduction chamber 17 may be communicated with the exterior via the purge port 18. In addition, the second upper space (the right-hand side space in FIG. 1) is formed as a purge chamber 20. The case main body 11 is also formed with a purge port 21, so that the purge chamber 20 may be communicated with the exterior via the purge port 21. Further, the upper space of the second inner space (the right-hand side space in FIG. 1) of the case main body 11 is formed as an atmosphere chamber 23. The case main body 11 is formed with an atmosphere port 24, so that the atmosphere chamber 23 may be communicated with the exterior via the atmosphere port 24.

Figure 4:
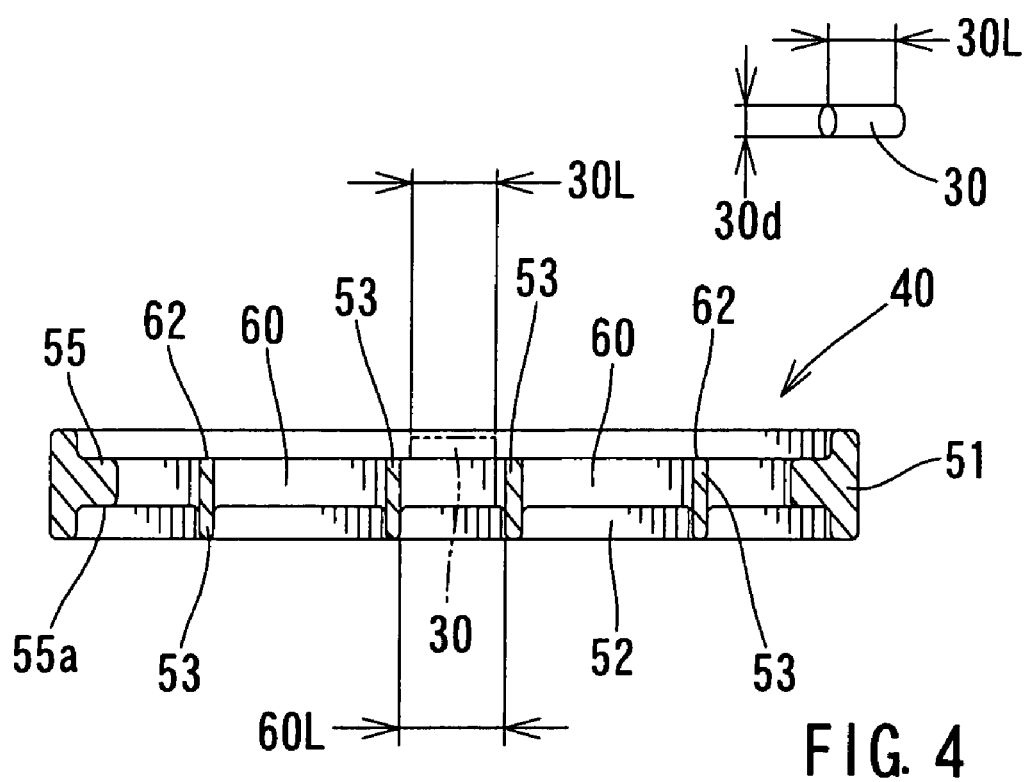
FIG. 4 is a sectional view taken along line IV-IV of FIG. 3.

The first inner space of the case main body 11 may preferably include a first adsorbent layer 26. Conversely, the second inner space of the case main body 11 may preferably include a second adsorbent layer 27 which corresponds to a lower half thereof, and a third adsorbent layer 28 which corresponds to an upper half thereof. Each of the adsorbent layers 26, 27 and 28 may preferably be composed of granular adsorbent materials 30 that can adsorb fuel vapor. An example of the adsorbent materials 30 is cylindrical-shaped activated carbon granules having a diameter 30d and a length 30L (FIG. 4).

The first adsorbent layer 26 and the introduction chamber 17 are separated from each other by a gas permeable filter 32. The first adsorbent layer 26 and the purge chamber 20 are separated from each other by a gas permeable filter 33. The third adsorbent layer 28 and the atmosphere chamber 23 are separated from each other by a gas permeable filter 34. The filters 32, 33 and 34 are formed from pad members, felt members or non-woven fabric members that are made from a fibrous material or other such materials.

The case main body 11 is formed with a communication chamber 36 that is positioned in the lower portion thereof. The communication chamber 36 is communicated with the first and second inner spaces via a clearance between the cover plate 12 and the dividing wall 14.

The first adsorbent layer 26 and the communication chamber 36 are separated from each other by a first gas permeable pressing plate 40 (which will be described hereinafter). The first pressing plate 40 is horizontally positioned in the first inner space so as to be vertically movable along an inner wall surface 38 of the first inner space. A first spring (elastic member) 41 that is made of a conical coil spring is positioned between the first pressing plate 40 and the cover plate 12. The first spring 41 has a large diameter side that contacts the pressing plate 40 and a small diameter side that contacts the cover plate 12. The first pressing plate 40 is pressed against the first adsorbent layer 26 by the spring force of the first spring 41.

The second adsorbent layer 27 and the communication chamber 36 are separated from each other by a second gas permeable pressing plate 45 (which will be described hereinafter). The second pressing plate 45 is horizontally positioned in the second inner space so as to be vertically movable along an inner wall surface 43 of the second inner space. A second spring (elastic member) 46 that is made of a conical coil spring is positioned between the second pressing plate 45 and the cover plate 12. The second spring 46 has a large diameter side that contacts the pressing plate 45 and a small diameter side that contacts the cover plate 12. The second pressing plate 45 is pressed against the second adsorbent layer 27 by the spring force of the second spring 46.

The second adsorbent layer 27 and the third adsorbent layer 28 are separated from each other by a gas permeable buffer plate 48 (which will be described hereinafter). The buffer plate 48 is horizontally positioned in the second inner space so as to be vertically movable along the inner wall surface 43 of the second inner space.

Further, the introduction port 18 of the case main body 11 is communicated with a vapor-phase portion of a fuel tank (not shown). The purge port 21 is communicated with an intake pipe (not shown) of an engine. Further, the atmosphere port 24 is opened to the atmosphere.

In the above-mentioned canister, under a condition in which the engine is stopped, for example, when fuel is supplied to the engine, fuel vapor generated in the fuel tank flows into the introduction chamber 17 through the introduction port 18. The fuel vapor flows through the filter 32, the first adsorbent layer 26, the first pressing plate 40, the communication chamber 36, the second pressing plate 45, the second adsorbent layer 27, the buffer plate 48 and the third adsorbent layer 28 and is adsorbed by the adsorbent materials 30 of the adsorbent layers 26, 27 and 28. Then, the air in which the fuel vapor is substantially removed flows through the filter 34 and is discharged into the atmosphere through the atmosphere chamber 23 and the atmosphere port 24.

To the contrary, during operation of the engine, negative pressure generated in the intake pipe acts on an interior of the purge chamber 20 through the purge port 21. Due to the negative pressure, the fuel vapor that has been adsorbed to the adsorbent layers 26, 27 and 28 flows through the filter 33 and is purged to the engine through the purge port 21. At this time, atmospheric air flows into the atmosphere chamber 23 through the atmosphere port 24.

Next, the first pressing plate (which will be simply referred to as the "pressing plate") 40 will be described in detail.

Figure 2:
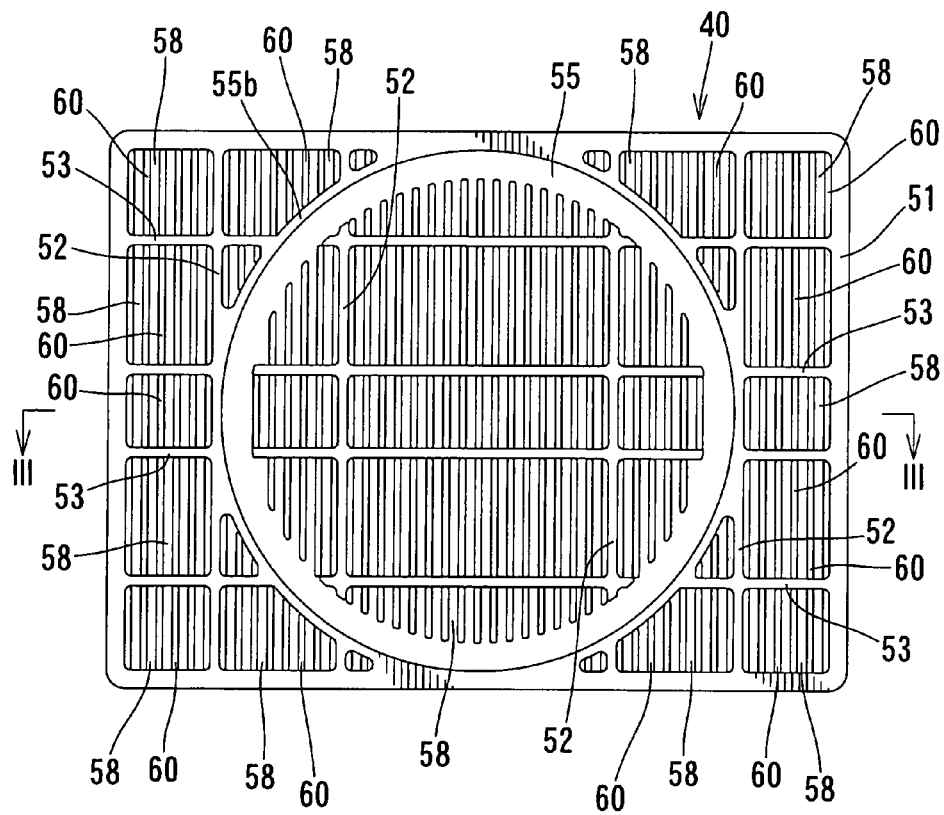
FIG. 2 is a bottom view of a pressing plate.
Figure 3:
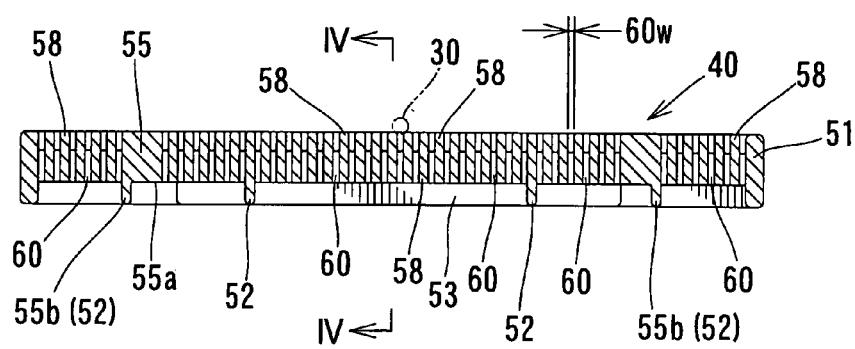
FIG. 3 is a sectional view taken along line III-III of FIG. 2.

As shown in FIG. 2, the pressing plate (dividing member) 40 is formed from, for example, a resin and has a substantially rectangular shape. The pressing plate 40 has a substantially rectangular outer frame portion 51, a plurality of (four in FIG. 2) longitudinal linear ribs 52 (FIG. 2), a plurality of (four in FIG. 2) lateral linear ribs 53 (FIG. 4) and a spring receiving portion 55 (FIG. 3). The longitudinal linear ribs 52 extend in a width direction of the outer frame portion 51 (a vertical direction in FIG. 2) and are arranged in parallel at predetermined intervals. The lateral linear ribs 53 extend in a length direction of the outer frame portion 51 (a horizontal direction in FIG. 2) and are arranged in parallel at predetermined intervals. The spring receiving portion 55 has a circular configuration which corresponds to the large diameter side of the first spring 41 (FIG. 1) and has a spring seat surface 55a that is formed in a lower surface thereof (FIG. 3). The spring seat surface 55a is formed with an annular rib 55b (FIG. 2) that extends therealong. The outer frame portion 51, the linear ribs 52 and 53 and the annular rib 55b of the spring receiving portion 55 are mutually connected (FIG. 2). The pressing plate 40 is reinforced by the outer frame portion 51, the linear ribs 52 and 53 and the spring receiving portion 55 including the annular rib 55b.

As shown in FIGS. 2 and 3, a large number of plate-shaped portions (rib-shaped portions) 58 are formed in the pressing plate 40. The plate-shaped portions 58 extend in the width direction of the outer frame portion 51 (the vertical direction in FIG. 2) and are arranged in parallel at predetermined intervals. The plate-shaped portions 58 are parallel to the longitudinal linear ribs 52. Further, the plate-shaped portions 58 are formed within regions that are defined by the outer frame portion 51, the lateral linear ribs 53 and the spring receiving portion 55.

A large number of ventilating holes 60 for flowing the fuel vapor are formed within the regions defined by the outer frame portion 51, the lateral linear ribs 53 and the spring receiving portion 55. The ventilating holes 60 may preferably be positioned between the plate-shaped portions 58 parallel to each other, between the plate-shaped portions 58 and the outer frame portion 51, between the plate-shaped portions 58 and the longitudinal linear ribs 52 and between the plate-shaped portions 58 and the spring receiving portion 55.

The ventilating holes 60 have an elongated configuration having an opening length 60L (FIG. 4) larger than the length 30L of the adsorbent materials 30. Also, the ventilating holes 60 have an opening width 60w (FIG. 3) that can restrict passage of the adsorbent materials 30. It is desirable that the opening width 60w of the ventilating holes 60 is set as large as possible so as to have an increased passage sectional area. However, the opening width 60w must be smaller than the diameter 30d of the adsorbent materials 30. The length 30L and the diameter 30d of the adsorbent materials 30 are given as an average values in granules of the adsorbent materials 30. The opening width 60w of the ventilating holes 60 is set so as to restrict the passage of the majority of the adsorbent materials 30. Further, since the ventilating holes 60 have the opening length 60L which is larger than the length 30L of the adsorbent materials 30, the ventilating holes 60 cannot be closed even if the adsorbent materials 30 are positioned on openings of the ventilating holes 60. If a plurality of adsorbent materials 30 are disposed in series along the openings of ventilating holes 60, end surfaces of the adsorbent materials 30 cannot substantially contact each other. Therefore, it is not considered that the ventilating holes 60 can be completely closed.

As best shown in FIG. 3, in an upper surface of the pressing plate 40 (i.e., a surface that faces the adsorbent materials 30), upper end surfaces of the outer frame portion 51, the longitudinal linear ribs 52, the spring receiving portion 55 and the plate-shaped portions 58 are coplanar with each other. However, as shown in FIG. 4, upper end surfaces of the lateral linear ribs 53 are lowered so as to form recesses 62 along the lateral linear ribs 53. The recess 62 may communicate between the openings of the ventilating holes 60 that are positioned adjacent to each other along the width direction of the pressing plate 40. As shown in FIG. 3, in the lower surface of the pressing plate 40, lower end surfaces of the outer frame portion 51, the linear ribs 52 and 53 and the annular rib 55b of the spring receiving portion 55 are coplanar with each other. Further, the lower end surfaces of the spring seat surface 55a of the spring receiving portion 55 and the plate-shaped portions 58 are coplanar with each other. However, the lower end surfaces of these members are positioned higher than a lower end surface of, for example, the outer frame portion 51.

As previously described, the pressing plate 40 is horizontally received in the first inner space of the case main body 11 of the case 10, so as to be vertically movable along the inner wall surface 38 of the first inner space. Also, the pressing plate 40 may preferably separate the first adsorbent layer 26 from the communication chamber 36, and may carry the adsorbent materials 30 of the adsorbent layer 26 thereon (FIG. 1). The large diameter side end surface (an upper end portion in FIG. 1) of the first spring 41 that is positioned between the pressing plate 40 and the cover plate 12 may contact the spring seat surface 55a of the spring receiving portion 55 (FIG. 3), so as to be held in face contact therewith.

The second pressing plate (dividing member) 45 has basically the same construction as the first pressing plate 40. Therefore, elements that are the same in the first and second pressing plate 40 and 45 will be identified by the same reference numerals and detailed description of such elements will be omitted. As stated above, the second pressing plate 45 is horizontally received in the second inner space of the case main body 11 of the case 10, so as to be vertically movable along the inner wall surface 43 of the second inner space. Also, the second pressing plate 45 may preferably separate the second adsorbent layer 27 from the communication chamber 36, and may carry the adsorbent materials 30 of the adsorbent layer 27 thereon (FIG. 1). The large diameter side end surface (an upper end surface in FIG. 1) of the second spring 46 that is positioned between the second pressing plate 45 and the cover plate 12 may contact the spring seat surface 55a of the spring receiving portion 55, so as to be held in face contact therewith. In the second pressing plate 45, a part of the spring receiving portion 55 may overlap the outer frame portion 51, and the longitudinal linear ribs 52 may be omitted. A part of the plate-shaped portions 58 can be thickened so as to have function of the ribs.

The buffer plate (dividing member) 48 has basically the same construction as the first pressing plate 40. Therefore, elements that are the same in the first pressing plate 40 and the buffer plate 48 will be identified by the same reference numerals and detailed description of such elements will be omitted. The buffer plate 48 faces the adsorbent materials 30 of the second and third adsorbent layers 27 and 28. Therefore, the buffer plate 48 may preferably be symmetrically formed, so as to have upper and lower halves that respectively have the same construction as the first pressing plate 40. Further, in the buffer plate 48, the spring receiving portion 55 and the longitudinal linear ribs 52 of the first pressing plate 40 are omitted. In addition, the upper end surface of the outer frame portion 51 is positioned higher than the upper end surfaces of the plate-shaped portions 58. Similarly, the lower end surface of the outer frame portion 51 is positioned lower than the lower end surfaces of the plate-shaped portions 58.

As described before, the buffer plate 48 is horizontally received in the second inner space of the case main body 11 of the case 10, so as to be vertically movable along the inner wall surface 43 of the second inner space. Also, the buffer plate 48 may preferably separate the second and third adsorbent layers 27 and 28 from each other (FIG. 1).

According to the above-mentioned canister, the granular adsorbent materials 30 are carried by the first pressing plate 40. Further, as previously described, a large number of ventilating holes 60 for flowing the fuel vapor are formed in the first pressing plate 40. The ventilating holes 60 have the opening length 60L larger than the length 30L of the adsorbent materials 30. Also, the ventilating holes 60 have the opening width 60w that can restrict the passage of the adsorbent materials 30. Thus, the adsorbent materials 30 can be effectively prevented from passing through the ventilating holes 60. Further, the ventilating holes 60 can be prevented from being clogged by the adsorbent materials 30.

In this way, the first pressing plate 40 has a function of grids and a function of filters in a conventional canister. Thus, according to the canister, the number of the construction elements can be effectively reduced than the conventional canister.

Further, the first pressing plate. 40 has a plurality of plate-shaped portions 58 that are arranged in parallel so as to restrict passage of the adsorbent materials 30. Thus, the adsorbent materials 30 can be prevented from passing through the ventilating holes 60. Further, the ventilating holes 60 can be prevented from being clogged by the adsorbent materials 30.

Further, in the canister, the first pressing plate 40 is pressed against the first adsorbent layer 26 by the spring force of the first spring 41.

Further, similar to the first pressing plate 40, the granular adsorbent materials 30 of the second adsorbent layer 27 received in the case 10 can be carried by the second pressing plate 45. Further, a large number of ventilating holes 60 for flowing the fuel vapor are formed in the second pressing plate 45. The ventilating holes 60 have the opening length 60L larger than the length 30L of the adsorbent materials 30. Also, the ventilating holes 60 have the elongated configuration having the opening width 60w that can restrict the passage of the adsorbent materials 30. Thus, the adsorbent materials 30 can be effectively prevented from passing through the ventilating holes 60. Further, the ventilating holes 60 can be prevented from being clogged by the adsorbent materials 30.

In this way, the second pressing plate 45 has the function of grids and the function of filters in the conventional canister. Thus, according to the canister, the number of the construction elements can be effectively reduced than the conventional canister.

Further, the second pressing plate 45 has a plurality of plate-shaped portions 58 that are arranged in parallel so as to restrict passage of the adsorbent materials 30. Thus, the adsorbent materials 30 can be prevented from passing through the ventilating holes 60. Further, the ventilating holes 60 can be prevented from being clogged by the adsorbent materials 30.

Further, in the canister, the second pressing plate 45 is pressed against the second adsorbent layer 27 by the spring force of the second spring 46.

Further, similar to the first pressing plate 40, the granular adsorbent materials 30 of the second and third adsorbent layers 27 and 28 received in the case 10 can be carried by the buffer plate 48. Further, a large number of ventilating holes 60 for flowing the fuel vapor are formed in the buffer plate 48. The ventilating holes 60 have the opening length 60L larger than the length 30L of the adsorbent materials 30. Also, the ventilating holes 60 have the elongated configuration having the opening width 60w that can restrict the passage of the adsorbent materials 30. Thus, the adsorbent materials 30 can be effectively prevented from passing through the ventilating holes 60. Further, the ventilating holes 60 can be prevented from being clogged by the adsorbent materials 30.

In this way, the buffer plate 48 has the function of grids and the function of filters in the conventional canister. Thus, according to the canister, the number of the construction elements can be effectively reduced than the conventional canister.

Further, the buffer plate 48 has a plurality of plate-shaped portions 58 that are arranged in parallel so as to restrict passage of the adsorbent materials 30. Thus, the adsorbent materials 30 can be prevented from passing through the ventilating holes 60. Further, the ventilating holes 60 can be prevented from being clogged by the adsorbent materials 30.

Further, in the canister, the buffer plate 48 is interleaved between the adjacent second and third adsorbent layers 27 and 28.

Second Detailed Representative Embodiment

A second detailed representative embodiment of the present invention is shown in FIGS. 5 to 12.

Because the second embodiment relates to the first embodiment, only constructions and elements that are different from the first embodiment will be explained in detail. Elements that are the same in the first and second embodiments will be identified by the same reference numerals and detailed description of such elements will be omitted.

This embodiment teaches a dividing plate 65 that can be used as the first pressing plate 40 and/or the second pressing plate 45 of the first embodiment. In the dividing plate 65, the linear ribs 52 and 53 and the spring receiving portion 55 of the first embodiment are respectively omitted.

Figure 5:
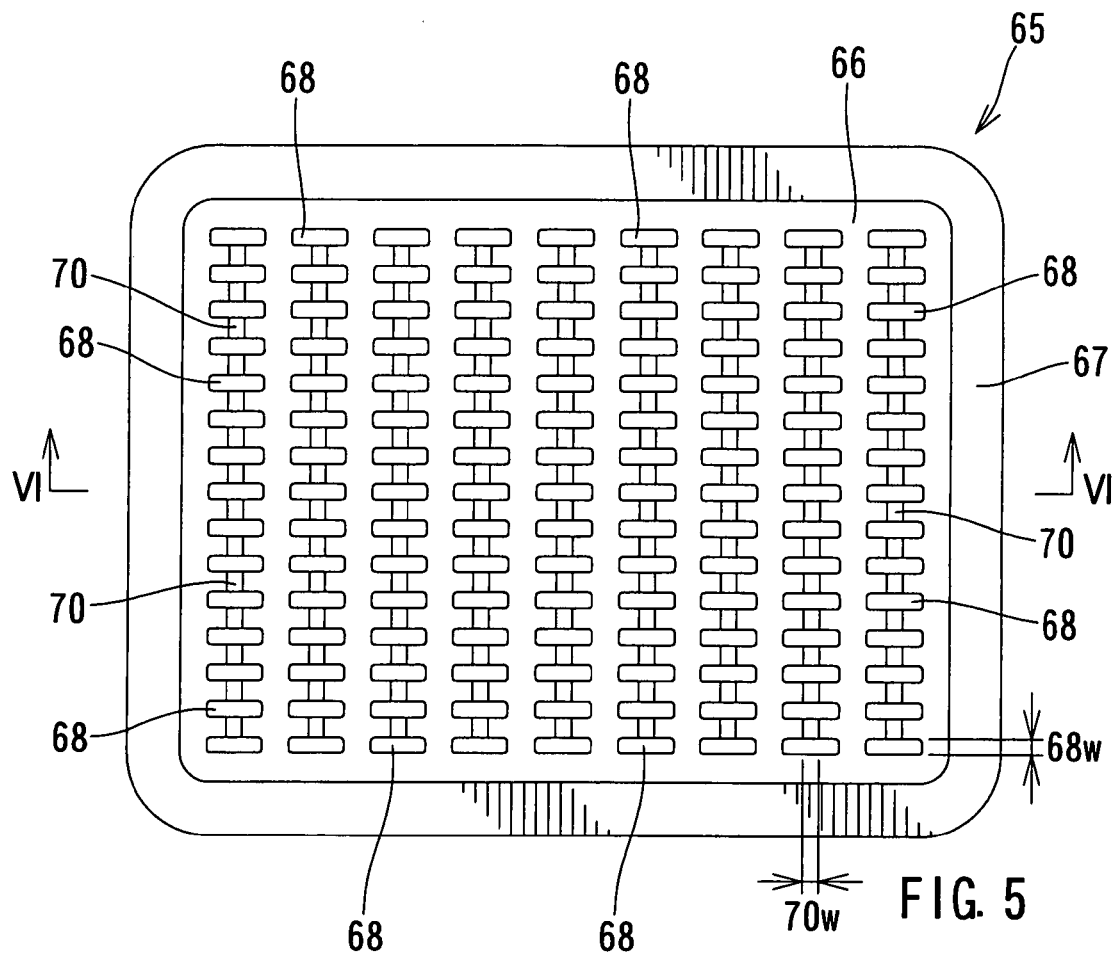
FIG. 5 is a plan view of a dividing plate according to a second embodiment of the present invention.

As shown in FIG. 5, the dividing plate (dividing member) 65 is formed from, for example, a resin and has a substantially rectangular shape. The dividing plate 65 has a main plate portion 66 and an outer frame portion 67. The outer frame portion 67 may preferably surround an outer periphery of the main plate portion 66 and protrude upward and downward with regard to the main plate portion 66.

Figure 6:
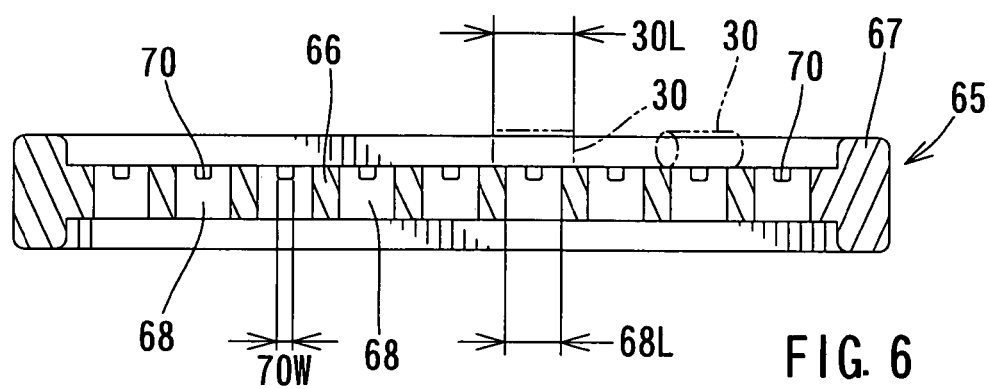
FIG. 6 is a sectional view taken along line VI-VI of FIG. 5.
Figure 7:
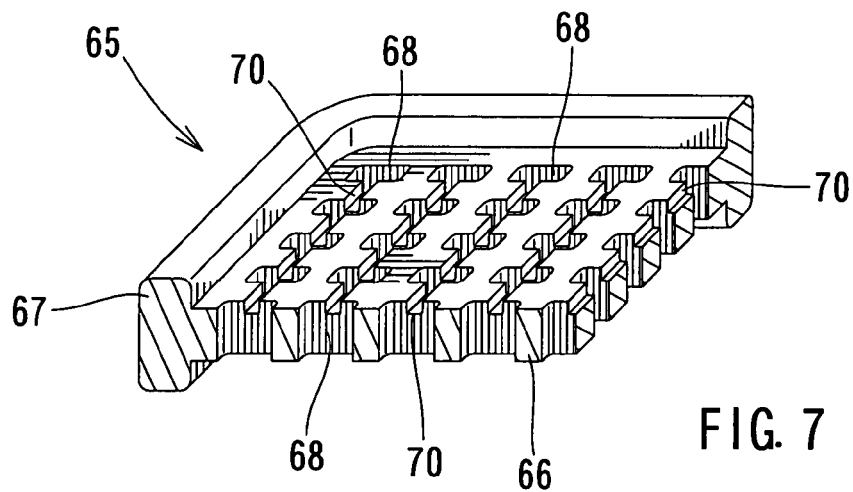
FIG. 7 is a partially cutaway perspective view of the dividing plate.

The main plate portion 66 has a plurality of elongated rectangular ventilating holes 68 that extend in a length direction (a lateral direction in FIG. 5) of the dividing plate 65. The ventilating holes 68 are arranged vertically and laterally at predetermined intervals in a net-like pattern (FIGS. 6 and 7). The ventilating holes 68 have an opening length 68L (FIG. 6) smaller than the length 30L of the granules of the adsorbent materials 30. Also, the ventilating holes 68 have an opening width 68w (FIG. 5) that can restrict passage of the adsorbent materials 30.

As shown in FIGS. 5 to 7, an upper surface of the main plate portion 66 of the dividing plate 65 (i.e., a surface that faces the adsorbent materials 30) is formed with recesses or grooves (recessed portions) 70 that can communicate between openings (upper end portions in FIG. 6) of the ventilating holes 68 that are positioned adjacent to each other in a width direction (a vertical direction in FIG. 5). The grooves 70 extend linearly in the width direction (the vertical direction in FIG. 5). Also, the grooves 70 extend across central portions in the length direction (the lateral direction in FIG. 5) of the ventilating holes 68. The grooves 70 are formed so as to have an opening width 70w (FIG. 5) that can restrict passage of the adsorbent materials 30. It is desirable that the opening width 70w of the grooves 70 is set as large as possible so as to have an increased passage sectional area. However, the opening width 70w must be smaller than the diameter 30d of the adsorbent materials 30.

According to this embodiment, the granular adsorbent materials 30 received in the case 10 can be carried by the dividing plate 65. Further, the dividing plate 65 has a large number of ventilating holes 68 for flowing the fuel vapor. The ventilating holes 68 have the elongated shape having the opening width 68w that can restrict passage of the adsorbent materials 30. Therefore, the adsorbent materials 30 can be prevented from passing through the ventilating holes 68. Further, the openings (the upper end portions) of the ventilating holes 68 are communicated with each other by the grooves 70 that are formed in the upper surface of the dividing plate 65 (i.e., the surface that faces the adsorbent materials 30). Thus, even if the opening (the upper end portions) of the ventilating holes 68 are closed by the adsorbent materials 30, fuel vapor can flow through the ventilating holes 68 via the grooves 70.

In this way, the dividing plate 65 has the function of grids and the function of filters in the conventional canister. Thus, according to the canister, the number of the construction elements can be effectively reduced than the conventional canister.

Further, the grooves 70 can be formed so as to communicate between the openings of the ventilating holes 68 that are positioned adjacent to each other in the length direction (the lateral direction in FIG. 5) of the dividing plate 65. The dividing plate 65 can be used as the first pressing plate 40 and/or the second pressing plate 45 of the first embodiment. Further, the dividing plate 65 can be used as the buffer plate 48.

Figure 8:
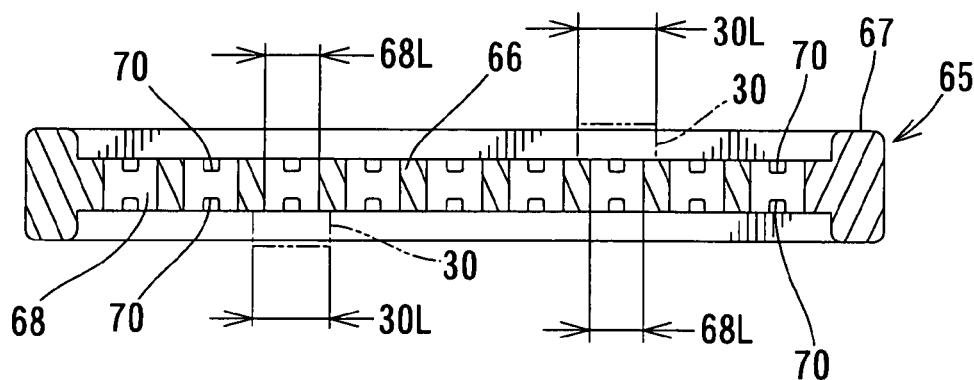
FIG. 8 is a sectional view of the dividing plate in a modified form.
Figure 9:
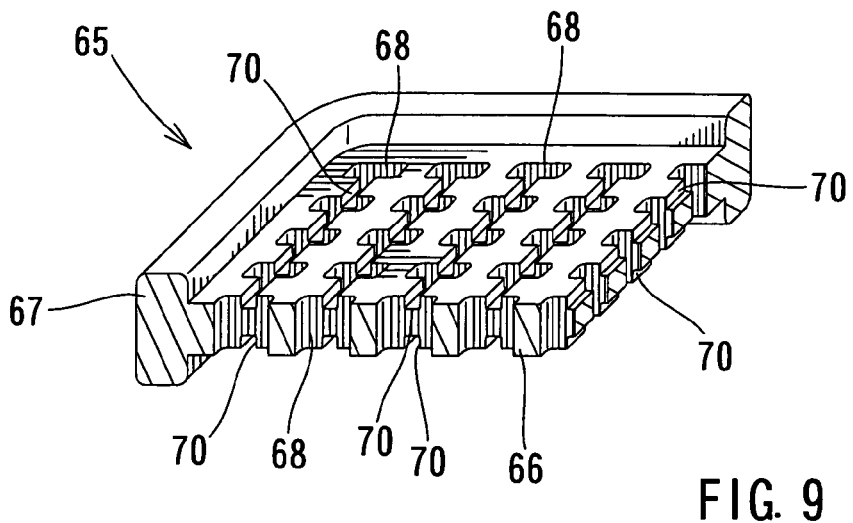
FIG. 9 is a partially cutaway perspective view of the dividing plate in a modified form.

As shown in FIGS. 8 and 9, the grooves 70 may be additionally formed in a lower surface of the main plate portion 66 of the dividing plate 65. That is, the grooves 70 may be formed in both of the upper and lower surfaces of the main plate portion 66, so that the dividing plate 65 may have a symmetrical shape.

The dividing plate 65 having the grooves 70 in both of the upper and lower surfaces thereof is suitable for the buffer plate 48 that can carry the granular adsorbent materials 30 of the second adsorbent layer 27 and the third adsorbent layer 28 received in the case 10 (FIG. 1).

Figure 10:
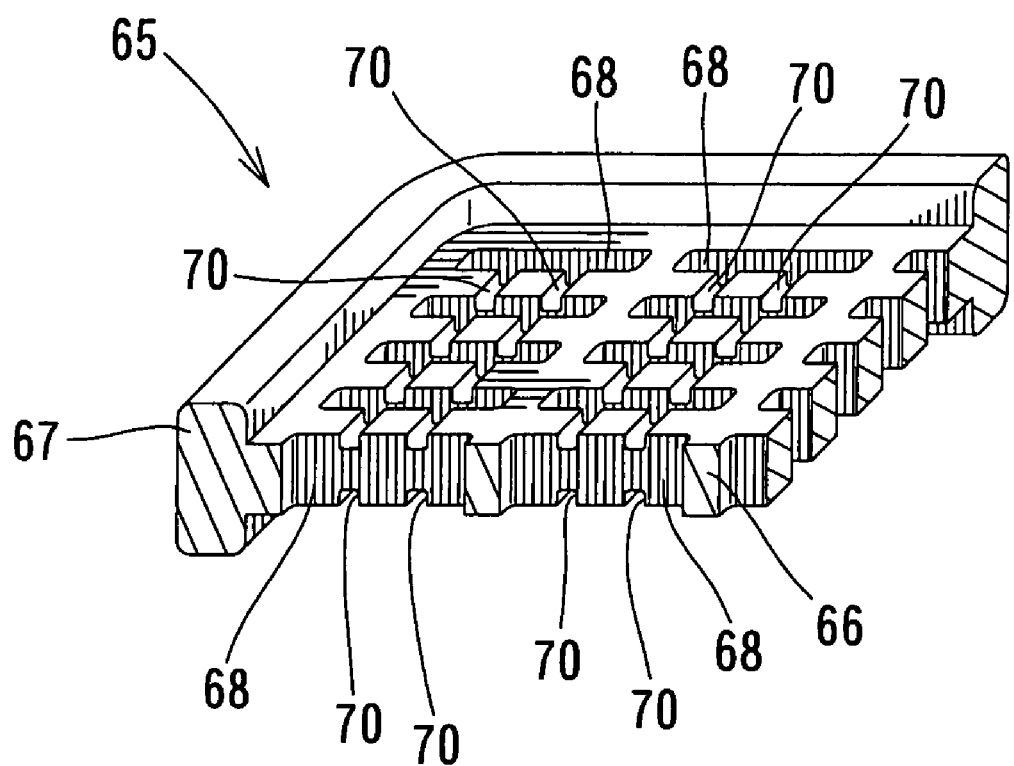
FIG. 10 is a partially cutaway perspective view of the dividing plate in a modified form.

As shown in FIG. 10, the adjacent ventilating holes 68 of the dividing plate 65 can be communicated with via a plurality of (two in FIG. 10) grooves 70 that are formed in parallel. In such a construction, air permeability of the dividing plate 65 can be increased. Further, such a construction is useful in a case that the opening length 68L of the ventilating holes 68 is large. Further, the grooves 70 formed in the upper or lower surface of the dividing plate 65 shown in FIG. 10 can be omitted.

Figure 11:
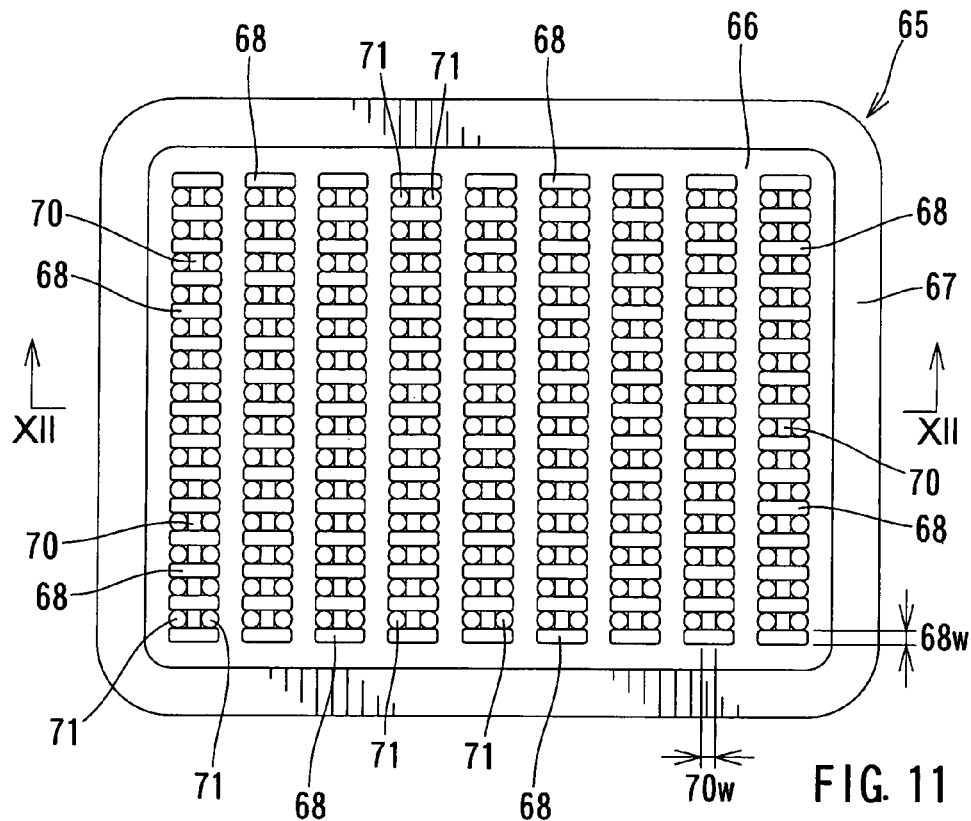
FIG. 11 is a plan view of the dividing plate in a modified form.
Figure 12:
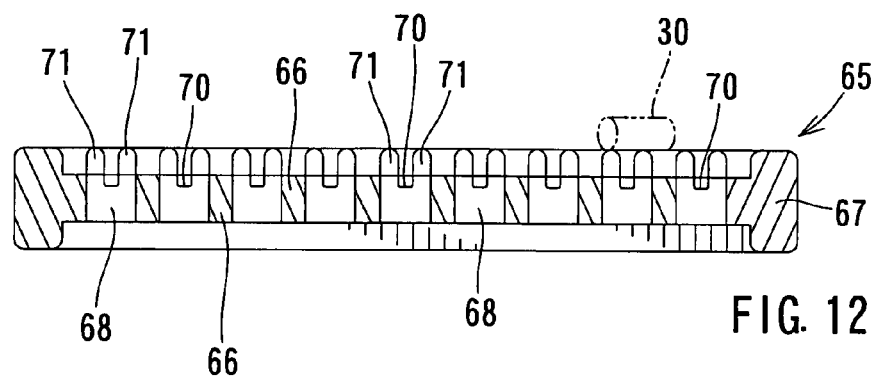
FIG. 12 is a sectional view taken along line XII-XII of FIG. 11.

As shown in FIGS. 11 and 12, the main plate portion 66 of the dividing plate 65 of the second embodiment may have cylindrical protrusions 71 formed thereon. The protrusions 71 are formed in the upper surface of the main plate portion 66 (the surface that faces the adsorbent materials 30), so that at least a part of the adsorbent materials 30 can be spaced away from the openings of the ventilating holes 68. The protrusions 71 are positioned between the adjacent ventilating holes 68 so as to be positioned across the grooves 70. In addition, the protrusions 71 are positioned so as to have a clearance therebetween that can restrict passage of the adsorbent materials 30. Preferably, the clearance may have a size that is equal to the opening width 68w of the ventilating holes 68 or the opening width 70w of the grooves 70.

In this construction, at least a part of the adsorbent materials 30 can be spaced away from the openings of the ventilating holes 68 by the protrusions 71. Therefore, the ventilating holes 68 can be effectively prevented from being clogged by the adsorbent materials 30. Thus, flow resistance of the fuel vapor can be reduced.

Further, because the clearance between the protrusions 71 has the size described above, the adsorbent materials 30 can be prevented from passing through the ventilating holes 68. As a result, the flow resistance of the fuel vapor can be reduced.

Third Detailed Representative Embodiment

A third detailed representative embodiment of the present invention is shown in FIGS. 13 to 16.

Because the third embodiment relates to the first embodiment, only constructions and elements that are different from the first embodiment will be explained in detail. Elements that are the same in the first and third embodiments will be identified by the same reference numerals and detailed description of such elements will be omitted.

This embodiment teaches a dividing plate 72 that can be used as the first pressing plate 40 and/or the second pressing plate 45 of the first embodiment. In the dividing plate 72, the linear ribs 52 and 53 and the spring receiving portion 55 of the first embodiment are respectively omitted.

Figure 13:
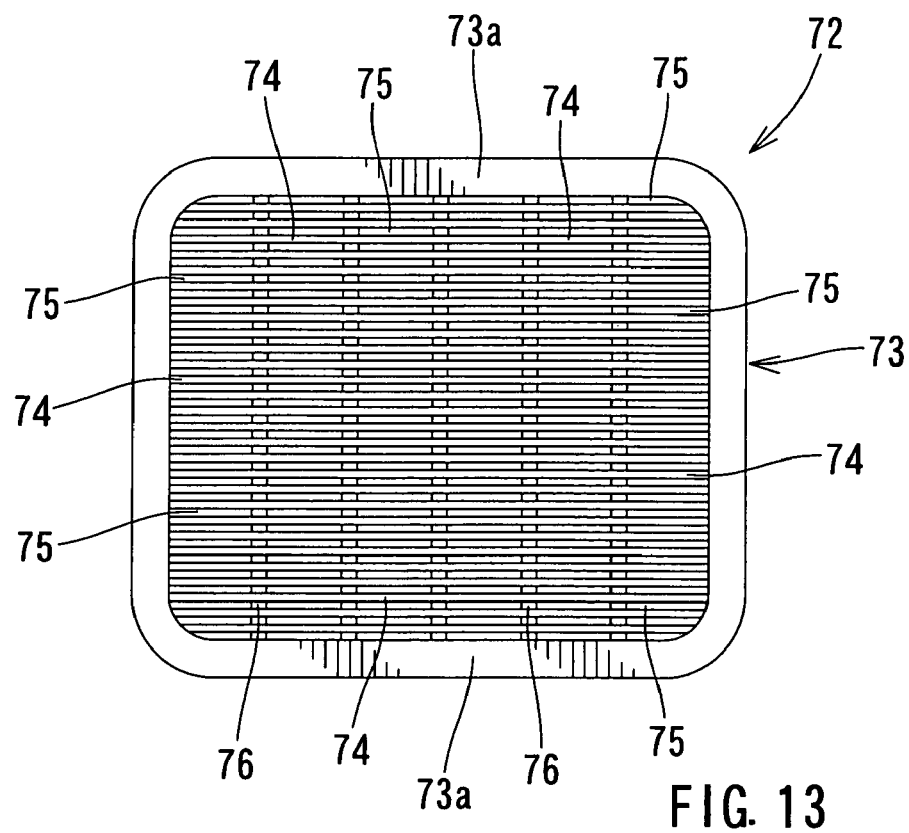
FIG. 13 is a plan view of a dividing plate according to a third embodiment of the present invention.

As shown in FIG. 13, the dividing plate (dividing member) 72 is formed from, for example, a resin and has a substantially rectangular shape. The dividing plate 72 has a rectangular frame-shaped outer frame portion 73 and a large number of plate-shaped portions (rib-shaped portions) 74 that extend within the outer frame portion 73. The plate-shaped portions 74 extend in a length direction of the outer frame portion 73 (a lateral direction in FIG. 13), so as to be positioned in parallel at predetermined intervals. Further, a large number of ventilating holes 75 for flowing the fuel vapor are formed within the outer frame portion 73. The ventilating holes 75 are formed between the plate-shaped portions 74 and between vertical side portions 73a of the outer frame portion 73 and the plate-shaped portions 74 adjacent to the side portions 73a.

Similar to the ventilating holes 60 (FIGS. 2 to 4), the ventilating holes 75 have an elongated shape that has an opening length larger than the length 30L (FIG. 16) of the granules of the adsorbent materials 30. Also, the ventilating holes 75 have an opening width 75w (FIG. 15) that can restrict passage of the adsorbent materials 30.

Figure 14:
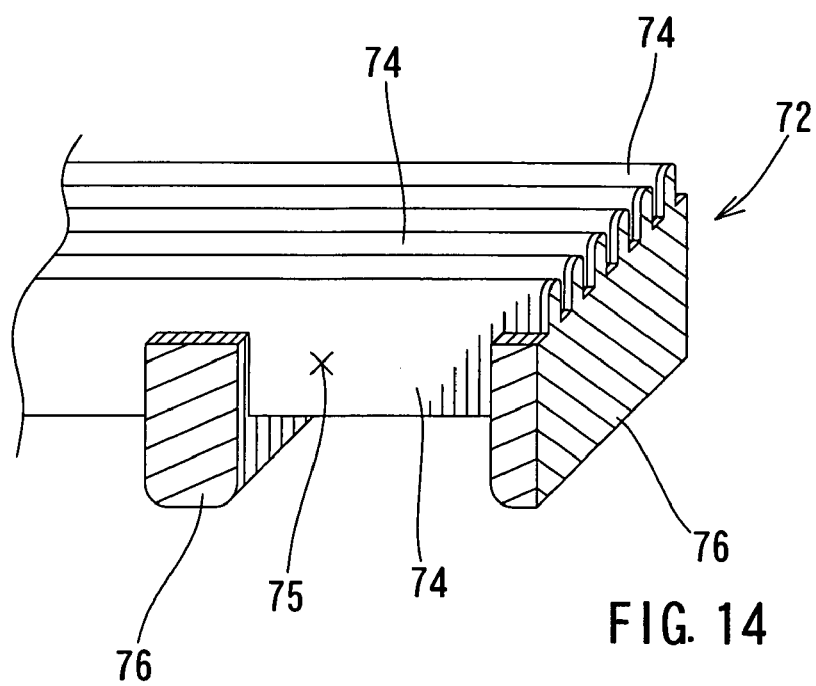
FIG. 14 is a partially cutaway perspective view of the dividing plate.
Figure 15:
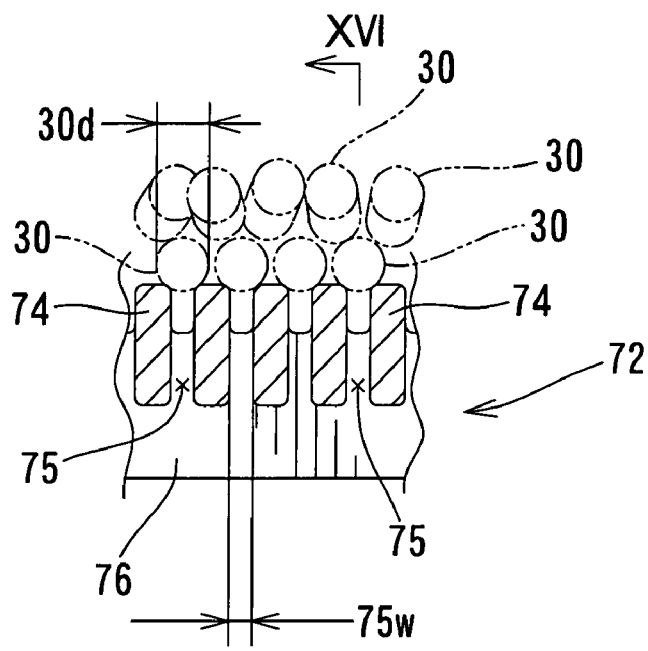
FIG. 15 is a partial sectional view of the dividing plate.
Figure 16:
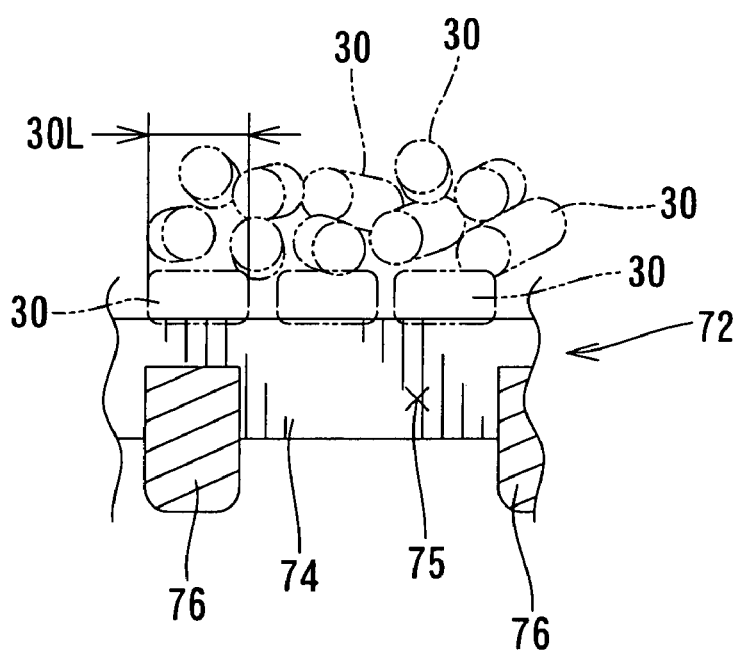
FIG. 16 is a sectional view taken along line XVI-XVI of FIG. 15.

Further, a lower side of the outer frame portion 73 is formed with a plurality of (five in FIG. 13) reinforcing ribs 76 that extend in a width direction (a vertical direction in FIG. 13). The reinforcing ribs 76 are arranged in parallel at predetermined intervals. As shown in FIG. 14, upper halves of the reinforcing ribs 76 are combined with lower halves of the plate-shaped portions 74.

This embodiment can provide the same effects as the first embodiment. The dividing plate 72 can be used as the first pressing plate 40 and/or the second pressing plate 45 of the first embodiment. Further, the dividing plate 72 can be used as the buffer plate 48. Further, the dividing plate 72 may be used upside down.

Fourth Detailed Representative Embodiment

Figure 17:
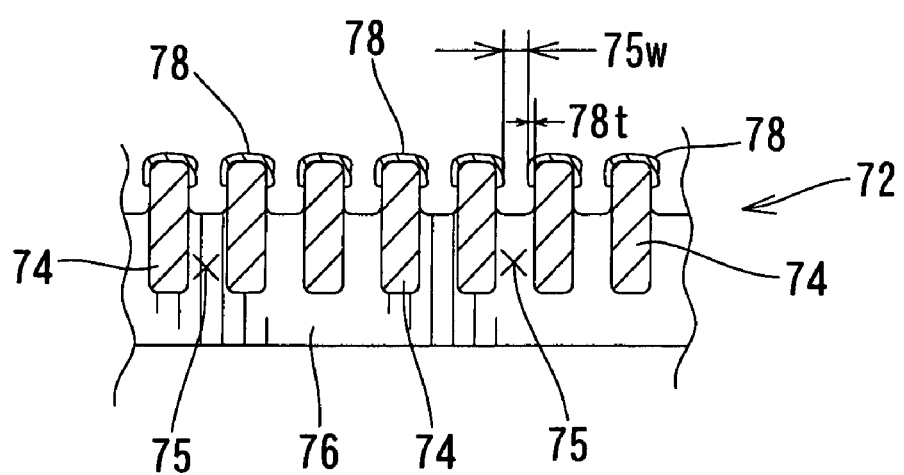
FIG. 17 is a partially cutaway sectional view of a dividing plate according to a fourth embodiment of the present invention.

A fourth detailed representative embodiment of the present invention is shown in FIG. 17.

Because the fourth embodiment relates to the third embodiment, only constructions and elements that are different from the third embodiment will be explained in detail. Elements that are the same in the third and fourth embodiments will be identified by the same reference numerals and detailed description of such elements will be omitted.

As shown in FIG. 17, in this embodiment, upper ends of the plate-shaped portions 74 of the dividing plate 72 (i.e., ends that face the adsorbent materials 30) are covered with sheet-shaped cushion members 78 having a thickness 78t. The cushion members 78 are formed from, for example, an elastic material (e.g., a synthetic rubber material), a foaming resin (e.g., an urethane resin), a fibrous coating material or other such materials. Further, in this embodiment, the plate-shaped portions 74 are positioned at increased intervals, so that the ventilating holes 75 may have the opening width 75w that corresponds to the interval between the cushion members 78.

This embodiment can provide the same effects as the third embodiment.

Further, the cushion members 78 provided to the dividing plate 72 may soften the shock of the absorbent 30 against the upper ends of the plate-shaped portions 74 of the dividing plate 72. Thus, the adsorbent materials 30 can be prevented from deforming when the adsorbent materials 30 contact the dividing plate 72.

Fifth Detailed Representative Embodiment

A fifth detailed representative embodiment of the present invention is shown in FIGS. 18-21.

Because the fifth embodiment relates to the third embodiment, only constructions and elements that are different from the third embodiment will be explained in detail. Elements that are the same in the third and fifth embodiments will be identified by the same reference numerals and detailed description of such elements will be omitted.

Figure 18:
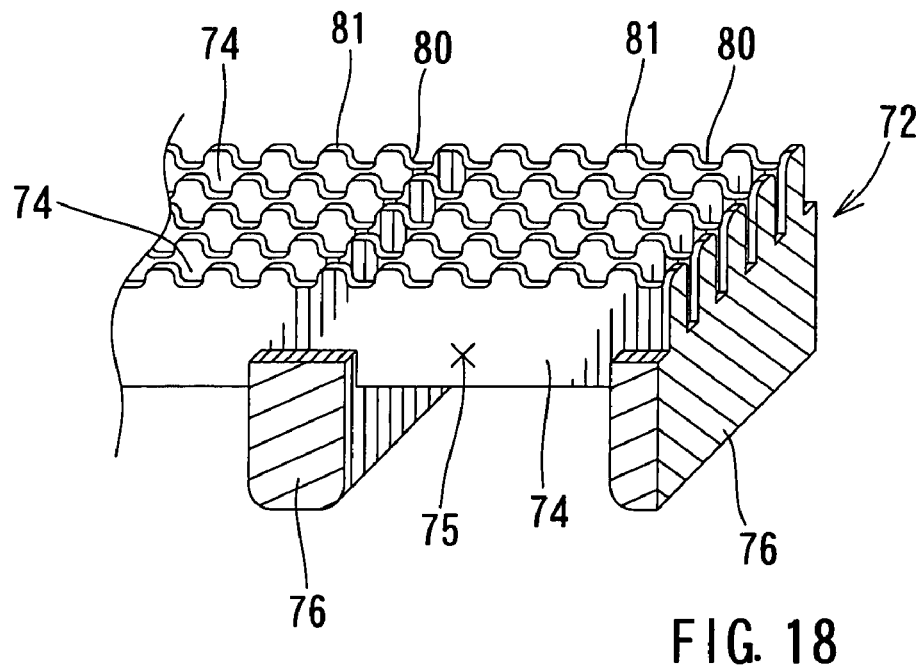
FIG. 18 is a partially cutaway perspective view of a dividing plate according to a fifth embodiment of the present invention.
Figure 19:
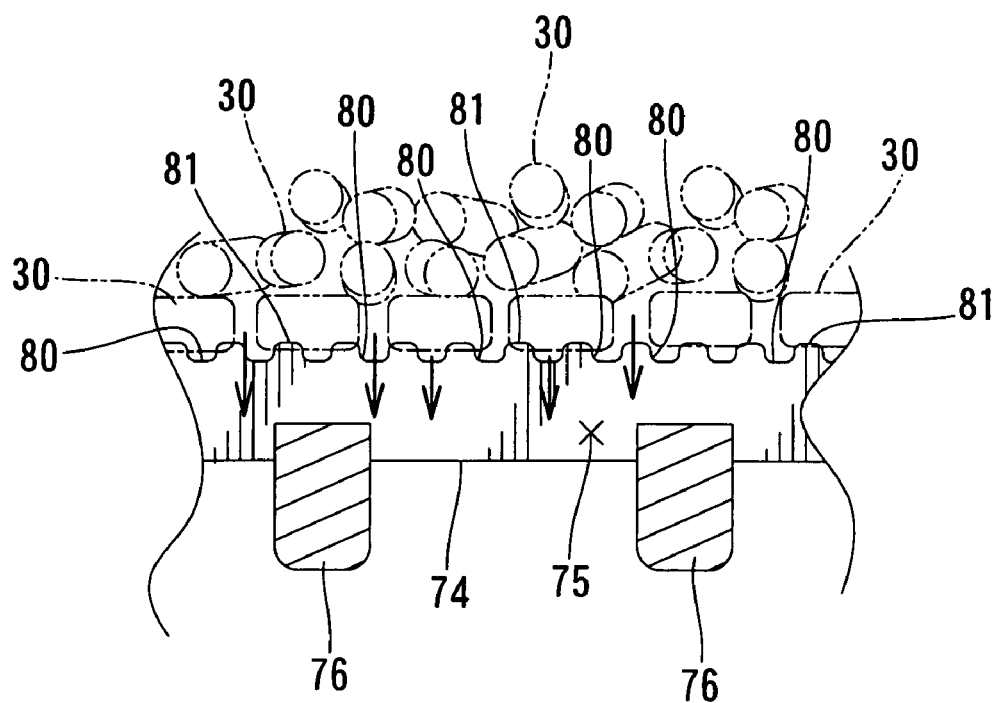
FIG. 19 is a partially cutaway sectional view of the dividing plate.

As shown in FIGS. 18 and 19, in this embodiment, upper ends of the plate-shaped portions 74 of the dividing plate 72 (i.e., ends that face the adsorbent materials 30) have convex portions 81 and concave portions 80 that are positioned alternately and continuously.

This embodiment can provide the same effects as the third embodiment.

Further, even if the adsorbent materials 30 is disposed on the adjacent plate-shaped portions 74 (more specifically, on the convex portions 81) so that the ventilating holes 75 are clogged by the adsorbent materials 30, the fuel vapor can flow through the ventilating holes 75 via the concave portions 80 (as shown by arrows in FIG. 19). Therefore, the ventilating holes 75 can be effectively prevented from being clogged by the adsorbent materials 30. Thus, flow resistance of the fuel vapor can be reduced.

Figure 20:
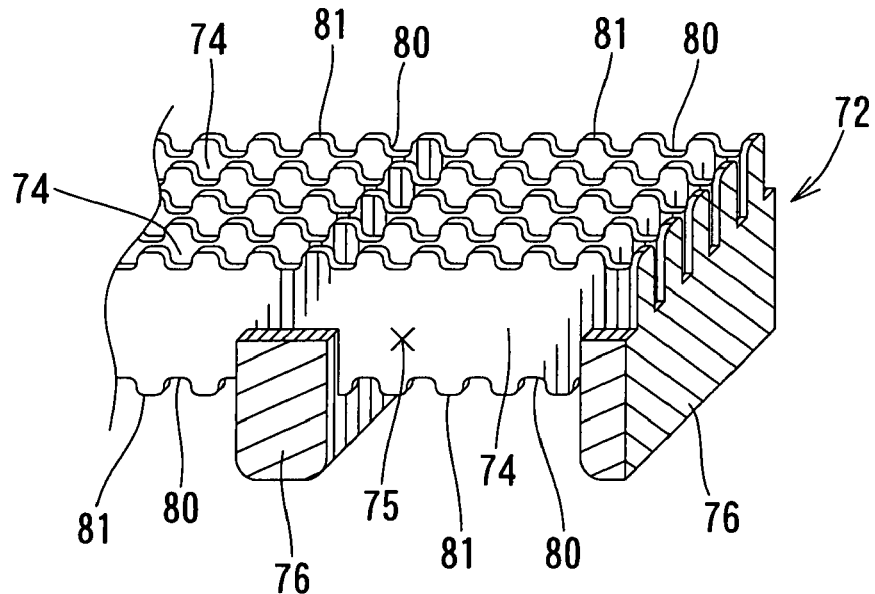
FIG. 20 is a partially cutaway perspective view of the dividing plate in a modified form.
Figure 21:
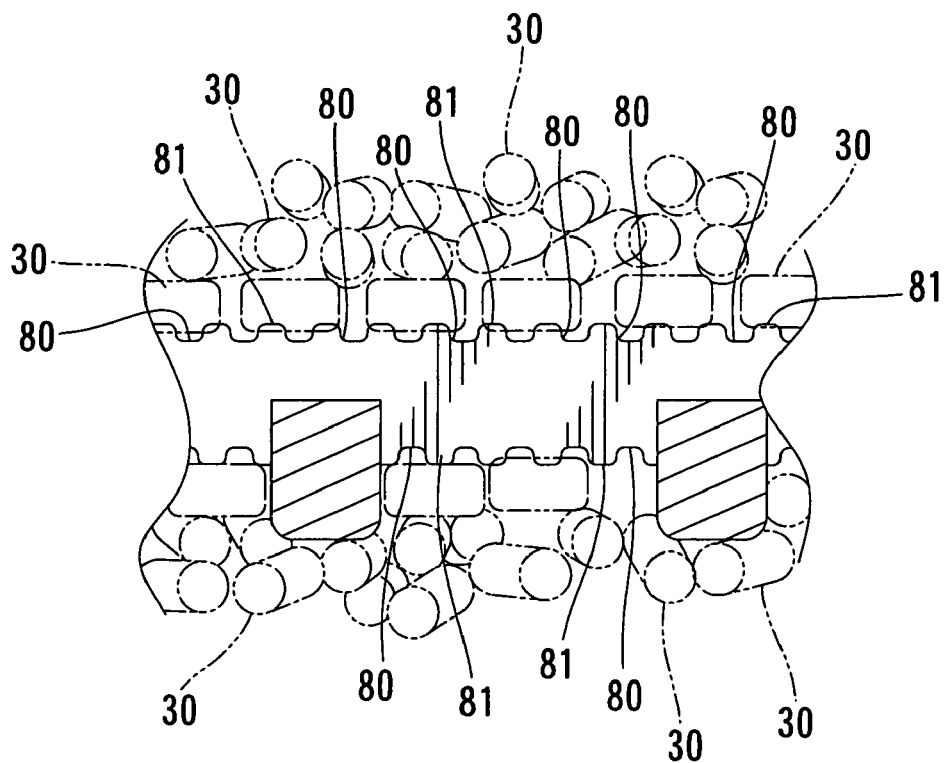
FIG. 21 is a partially cutaway sectional view of the dividing plate in a modified form.

As shown in FIGS. 20 and 21, similar to the upper ends of the plate-shaped portions 74 of the dividing plate 72, lower ends thereof may have the convex portions 81 and the concave portions 80. That is, the convex portions 81 and the concave portions 80 may be formed in both of the upper and lower surfaces of the plate-shaped portions 74, so that the plate-shaped portions 74 may have a symmetrical shape. The dividing plate 72 thus constructed is suitable as the buffer plate 48 that carries the granular adsorbent materials 30 of the second adsorbent layer 27 and the third adsorbent layer 28 received in the case 10 (FIG. 1).

Sixth Detailed Representative Embodiment

Figure 22:
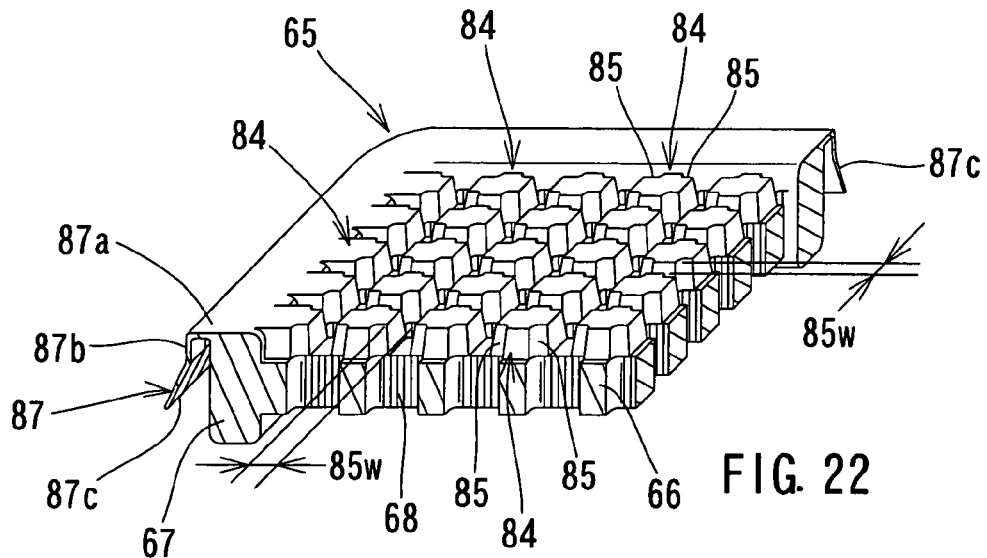
FIG. 22 is a partially cutaway perspective view of a dividing plate according to a sixth embodiment of the present invention.
Figure 23:
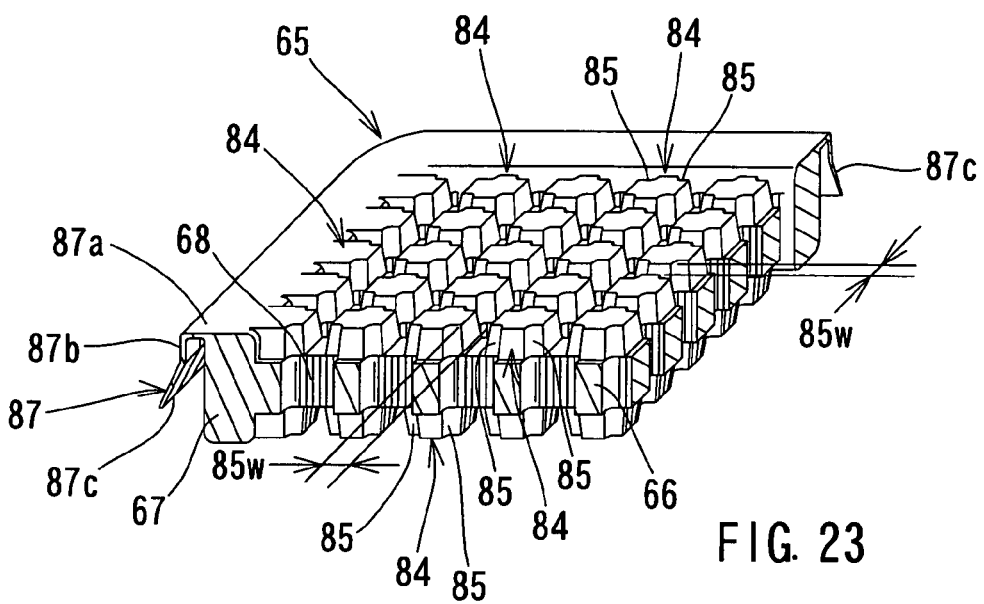
FIG. 23 is a partially cutaway perspective view of the dividing plate in a modified form.

A sixth detailed representative embodiment of the present invention is shown in FIGS. 22 and 23.

Because the sixth embodiment relates to the second embodiment, only constructions and elements that are different from the second embodiment will be explained in detail. Elements that are the same in the second and sixth embodiments will be identified by the same reference numerals and detailed description of such elements will be omitted.

As shown in FIG. 22, in this embodiment, instead of the grooves 70 of the dividing plate 65 of the second embodiment, the main plate portion 66 of the dividing plate 65 is formed with substantially trapezoidal protrusions 84. The protrusions 84 are provided on an upper surface of the main plate portion 66 (i.e., a surface that face the adsorbent materials 30), so that at least a part of the adsorbent materials 30 can be spaced away from the openings of the ventilating holes 68. The protrusions 84 are positioned between the adjacent ventilating holes 68 and have notched corner portions 85 that are continuous with corner portions of the ventilating holes 68. For example, the protrusion 84 that is positioned among the adjacent four ventilating holes 68 has the four notched corner portions 85, so as to have substantially a cross-shape in cross section. Conversely, the protrusion 84 that is positioned among the outer frame portion 67 and the adjacent two ventilating holes 68 has the two notched corner portions 85, so as to have substantially a T-shape in cross section. Also, clearances are formed between the adjacent protrusions 84. Each of the clearances has an opening width 85w that can restrict passage of the adsorbent materials 30.

The outer frame portion 67 is circumferentially formed with an annular contact member 87 that can elastically contact the inner wall surface 38 of the first inner space (or the inner wall surface 43 of the second inner space) of the case 10 (FIG. 1). The contact member 87 has a flange-shaped base plate portion 87a that protrudes from an upper periphery of the outer frame portion 67, an extending portion 87b that is bent downwards from a distal end of the base end portion 87a, and a large number of elastically deformable lip portions 87c that extend downwardly and outwardly from a distal end of the extending portion 87b.

This embodiment can provide the same effects as the second embodiment.

In this embodiment, at least a part of the adsorbent materials 30 can be spaced away from the openings of the ventilating holes 68 by the protrusions 84. Therefore, the ventilating holes 68 can be effectively prevented from being clogged by the adsorbent materials 30. Thus, flow resistance of the fuel vapor can be reduced.

Further, each of the protrusions 84 has the notched corner portions 85. Therefore, the protrusions 84 may have a high strength.

The lip portions 87c of the contact member 87 may elastically contact the inner wall surface 38 or 43 of the case 10. As a result, a clearance formed between an outer circumferential surface of the dividing plate 65 and the inner wall surface 38 or 43 of the case 10 is effectively closed, so that the adsorbent materials 30 can be prevented from moving or migrating through the clearance.

As shown in FIG. 23, similar to an upper surface of the main plate portion 66 of the dividing plate 65, a lower surface thereof may have the protrusions 84. The dividing plate 65 thus constructed is suitable as the buffer plate 48 that carries the granular adsorbent materials 30 of the second adsorbent layer 27 and the third adsorbent layer 28 received in the case 10 (FIG. 1).

Seventh Detailed Representative Embodiment

Figure 24:
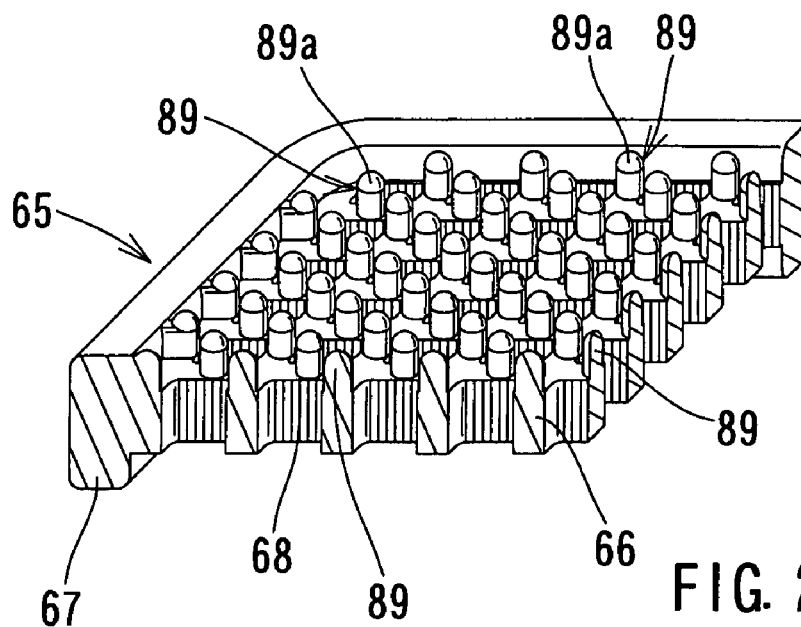
FIG. 24 is a partially cutaway perspective view of a dividing plate according to a seventh embodiment of the present invention.
Figure 25:
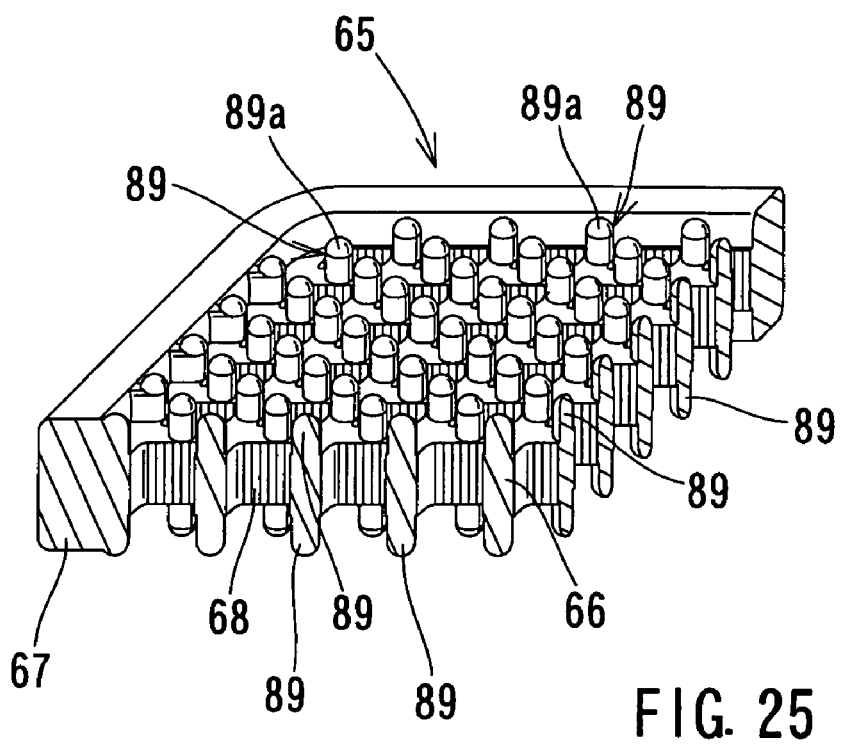
FIG. 25 is a partially cutaway perspective view of the dividing plate in a modified form.

A seventh detailed representative embodiment of the present invention is shown in FIGS. 24 and 25.

Because the seventh embodiment relates to the sixth embodiment, only constructions and elements that are different from the sixth embodiment will be explained in detail. Elements that are the same in the sixth and seventh will be identified by the same reference numerals and detailed description of such elements will be omitted.

As shown in FIG. 24, in this embodiment, instead of the protrusions 84 of the sixth embodiment, the main plate portion 66 of the dividing plate 65 is formed with cylindrical protrusions 89. Each of the protrusions 89 has a semi-spherical distal end portions 89a. Further, in the dividing plate 65 of this embodiment, the contact member 87 (FIG. 22) of the sixth embodiment is omitted.

This embodiment can provide the same effects as the sixth embodiment.

Further, because the protrusions 89 have a cylindrical shape, flow resistance of the fuel vapor that flows between the protrusions 89 can be reduced. In addition, because the protrusions 89 have the semi-spherical distal end portions 89a, the protrusions 89 can effectively absorb the impact from the adsorbent materials 30. As will be appreciated, the protrusions 89 may have a prismatic shape (e.g., a triangular prism shape, a rectangular prism shape and a hexagonal prism shape). Moreover, the protrusions 89 may have a conical shape, a pyramidal shape, a truncated conical shape, a truncated pyramidal shape or other such shapes.

As shown in FIG. 25, similar to the upper surface of the main plate portion 66 of the dividing plate 65, the lower surface thereof may have the protrusions 89.

Eighth Detailed Representative Embodiment

Figure 26:
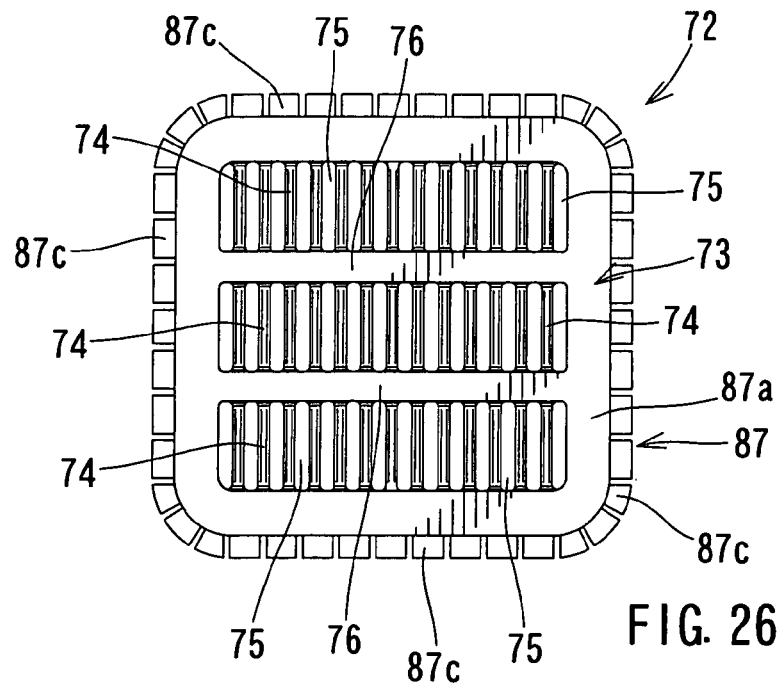
FIG. 26 is a plan view of a dividing plate according to a eighth embodiment of the present invention.
Figure 27:
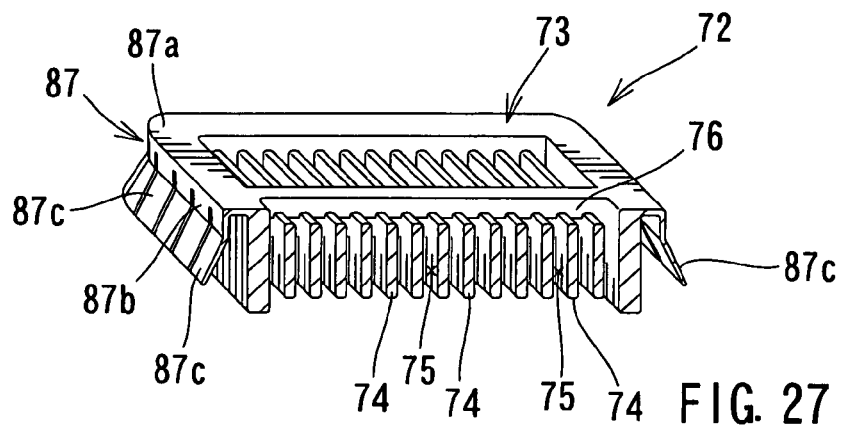
FIG. 27 is a partially cutaway perspective view of the dividing plate.
Figure 28:
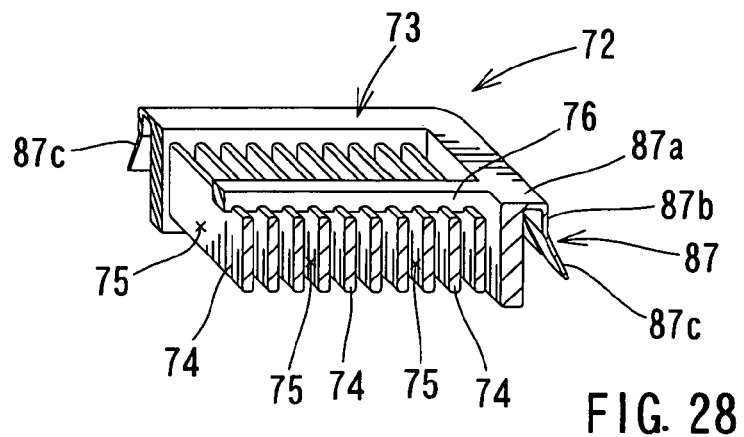
FIG. 28 is a partially cutaway perspective view of the dividing plate.

An eighth detailed representative embodiment of the present invention is shown in FIGS. 26 to 28.

Because the eighth embodiment relates to the third embodiment, only constructions and elements that are different from the third embodiment will be explained in detail. Elements that are the same in the third and eighth embodiments will be identified by the same reference numerals and detailed description of such elements will be omitted.

As shown in FIGS. 26 to 28, in this embodiment, the plate-shaped portions 74 extend in a width direction of the outer frame portion 73 (a vertical direction in FIG. 26. Further, the reinforcing ribs 76 are formed in an upper side of the outer frame portion 73. The reinforcing ribs 76 extend in a length direction (a lateral direction in FIG. 26). As shown in FIGS. 27 and 28, lower halves of the reinforcing ribs 76 are combined with upper halves of the plate-shaped portions 74.

The outer frame portion 73 of the dividing plate 72 is circumferentially formed with an annular contact member 87 that is described in the sixth embodiment (FIG. 22).

This embodiment can provide the same effects as the third embodiment. Further, the dividing plate 72 thus constructed can be used upside down.

Ninth Detailed Representative Embodiment

Figure 29:
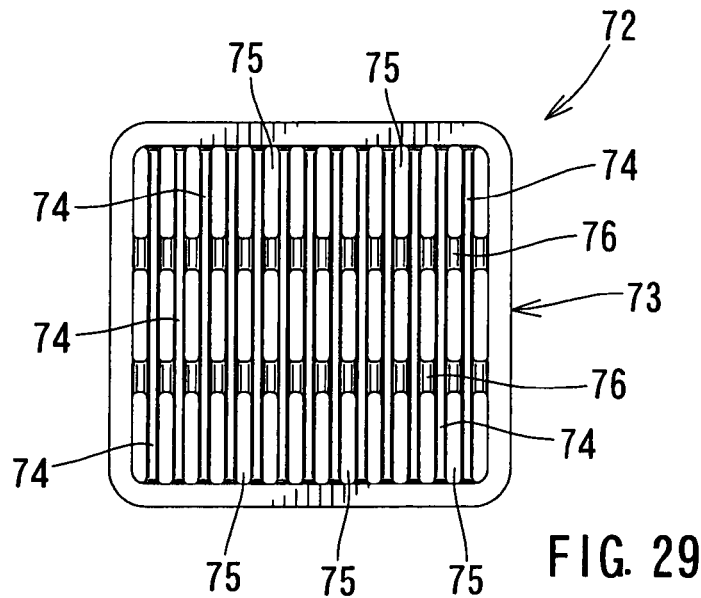
FIG. 29 is a plan view of a dividing plate according to a ninth embodiment of the present invention.
Figure 30:
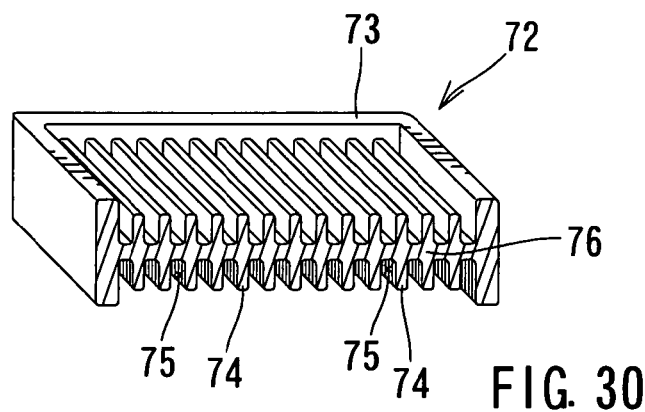
FIG. 30 is a partially cutaway perspective view of the dividing plate.
Figure 31:
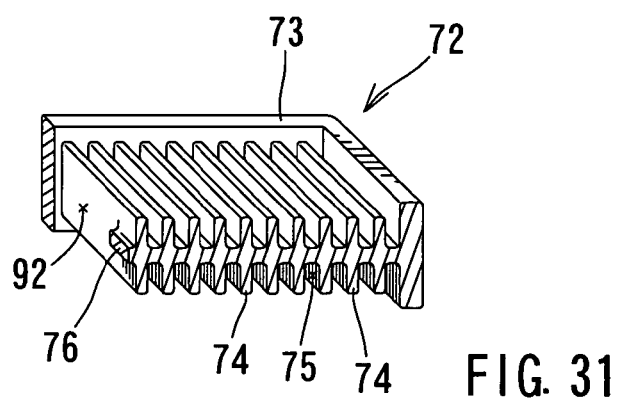
FIG. 31 is a partially cutaway perspective view of the dividing plate.

A ninth detailed representative embodiment of the present invention is shown in FIGS. 29 to 31.

Because the ninth embodiment relates to the eighth embodiment, only constructions and elements that are different from the eighth embodiment will be explained in detail. Elements that are the same in the eighth and ninth embodiments will be identified by the same reference numerals and detailed description of such elements will be omitted.

As shown in FIGS. 29 to 31, in this embodiment, the reinforcing ribs 76 of the dividing plate 72 are formed in the outer frame portion 73. The reinforcing ribs 76 extend in a length direction (a lateral direction in FIG. 29). As shown in FIGS. 30 and 31, unlike the eighth embodiment, the reinforcing ribs 76 extend through vertically central portions of the plate-shaped portions 74 and combined therewith. Thus, the ventilating holes 75 of this embodiment are communicated with each other via communication holes 92 (FIG. 31) that are formed between the reinforcing ribs 76 and between the outer frame portion 73 and the reinforcing ribs 76. In the dividing plate 65 of this embodiment, the contact member 87 of the sixth embodiment is omitted.

This embodiment can provide the same effects as the eighth embodiment. Further, the dividing plate 72 thus constructed can be used upside down.

Tenth Detailed Representative Embodiment

Figure 32:
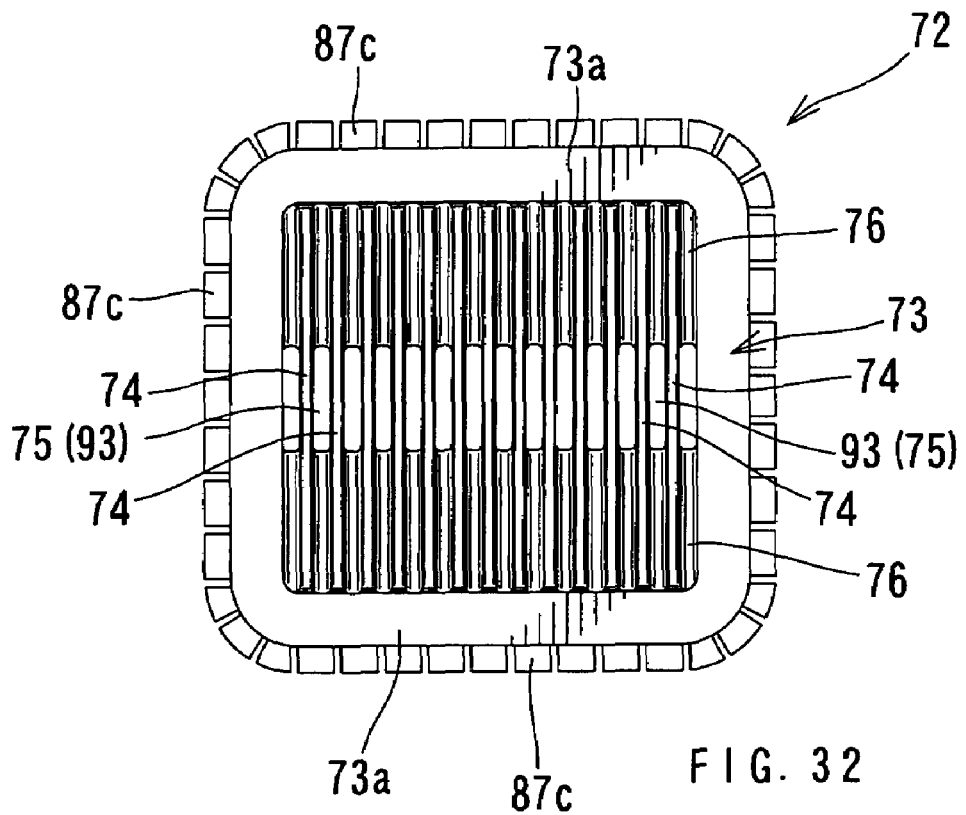
FIG. 32 is a plan view of a dividing plate according to a tenth embodiment of the present invention.
Figure 33:
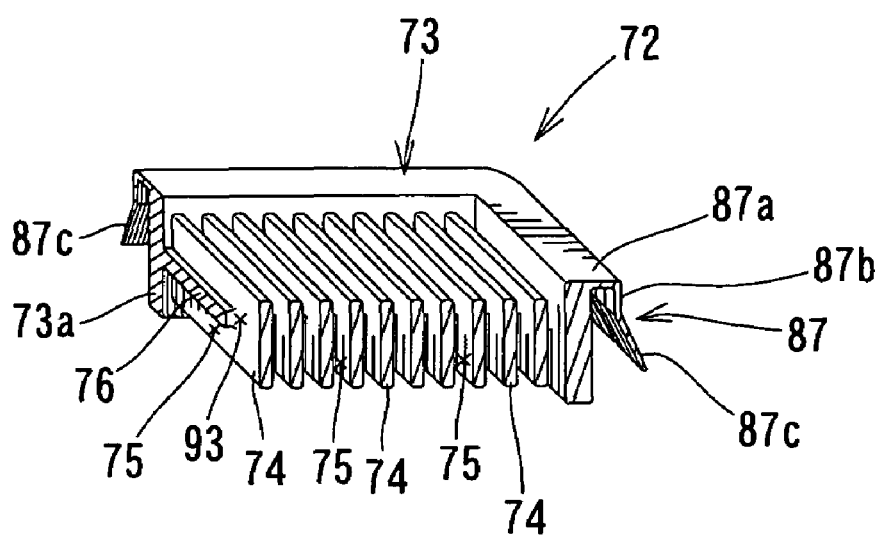
FIG. 33 is a partially cutaway perspective view of the dividing plate.

A tenth detailed representative embodiment of the present invention is shown in FIGS. 32 and 33.

Because the tenth embodiment relates to the eighth embodiment, only constructions and elements that are different from the eighth embodiment will be explained in detail. Elements that are the same in the eighth and tenth embodiments will be identified by the same reference numerals and detailed description of such elements will be omitted.

As shown in FIGS. 32 and 33, in this embodiment, the reinforcing ribs 76 of the dividing plate 72 are formed in the outer frame portion 73. The reinforcing ribs 76 extend in a length direction (a lateral direction in FIG. 32). Similar to the eighth embodiment, the reinforcing ribs 76 extend through vertically central portions of the plate-shaped portions 74 and combined therewith. However, unlike the eighth embodiment, the reinforcing ribs 76 are integrally formed with the side portions 73a of the outer frame portion 73. Thus, the ventilating holes 75 of this embodiment are communicated with each other via communication holes 93 (FIG. 33) that are formed between the reinforcing ribs 76.

A total area of the communication holes 93 may preferably be determined such that dense fuel vapor adsorbed by the second adsorbent layer 27 can be prevented from diffusing and flowing into the third adsorbent layer 28. Further, the total area of the communication holes 93 is determined so as not to provide increased flow resistance when a large amount of air and fuel vapor flows as in the case of fuel supply or maximum purge. Further, the total area of the communication holes 93 is determined so as to be still smaller than a minimum area of clearances formed between the plate-shaped portions 74 and the adsorbent materials 30 disposed thereon.

This embodiment can provide the same effects as the eighth embodiment. Further, the dividing plate 72 thus constructed can be used upside down.

Further, this embodiment further has the following effects.

When the canister is manufactured, the area of the clearances formed between the plate-shaped portions 74 and the adsorbent materials 30 may be varied. However, as described above, the total area of the communication holes 93 is determined so as to be smaller than the minimum area of the clearances formed between the plate-shaped portions 74 and the adsorbent materials 30. Therefore, even if the clearances are varied, the communication holes 93 may effectively prevent the air and fuel vapor from excessively flowing from the second adsorbent layer 27 toward the third adsorbent layer 28.

Thus, diffusion of the air and fuel vapor into the second adsorbent layer 27 and the third adsorbent layer 28 can be effectively reduced. As a result, the canister can effectively prevent the fuel vapor from being discharged into the atmosphere.

Further, since the total area of the communication holes 93 is determined as described above, the canister may have reduced flow resistance during fuel supply or purge operation.

Eleventh Detailed Representative Embodiment

Figure 34:
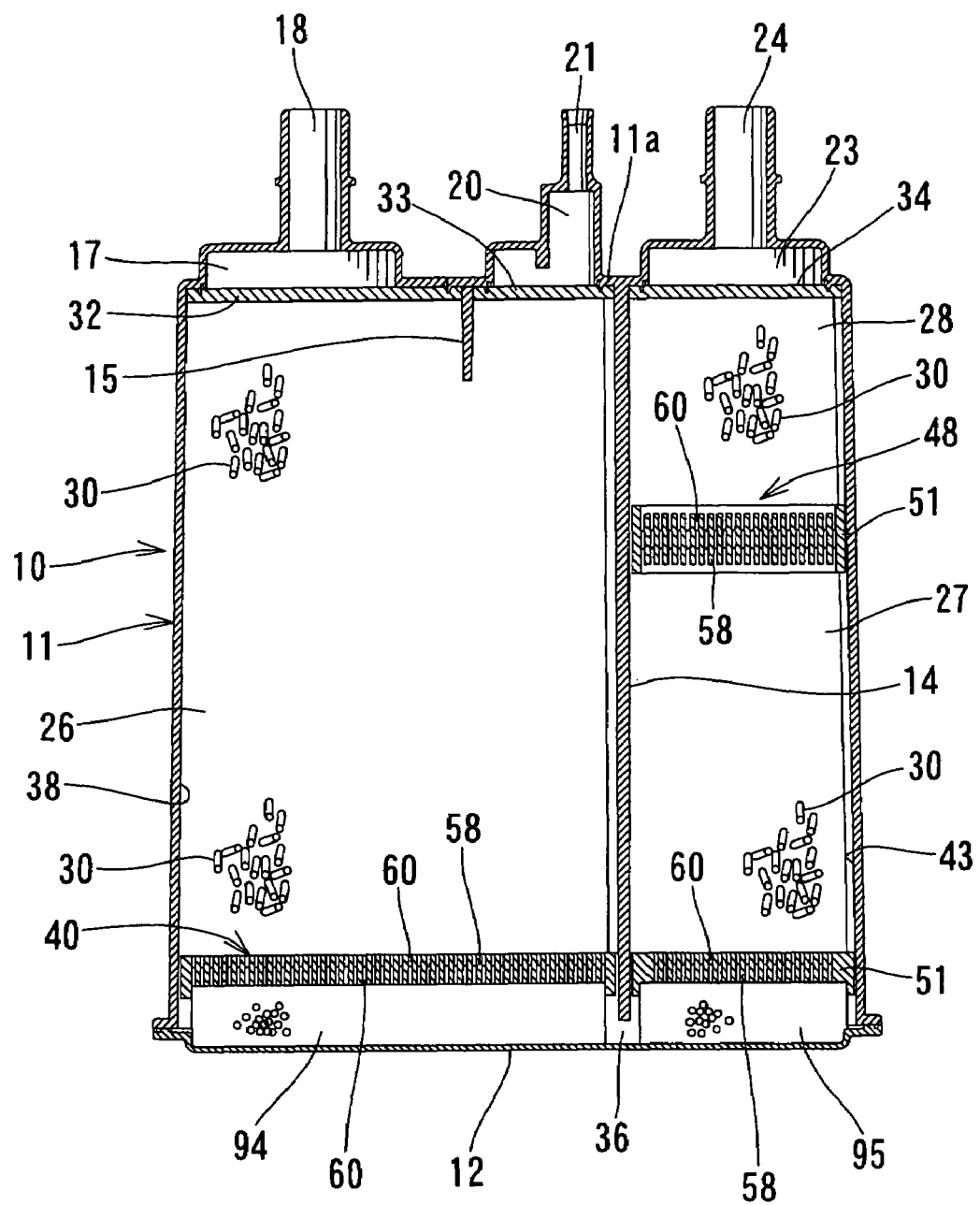
FIG. 34 is a sectional view of a canister according to an eleventh embodiment of the present invention.

A eleventh detailed representative embodiment of the present invention is shown in FIG. 34.

Because the eleventh embodiment relates to the first embodiment, only constructions and elements that are different from the first embodiment will be explained in detail. Elements that are the same in the first and eleventh embodiments will be identified by the same reference numerals and detailed description of such elements will be omitted.

As shown in FIG. 34, in this embodiment, instead of the springs 41 and 46 of the first embodiment, gas permeable resilient members (elastic members) 94 and 95 are used. The resilient members 94 and 95 are formed from a foaming resin (e.g., a urethane resin), a fibrous elastic material or other such materials. It is desirable to mix an adsorbent material (e.g., activated carbon) to the resilient members 94 and 95. In the pressing plates 40 and 45, the longitudinal linear ribs 52 and the spring receiving portions 55 are omitted.

This embodiment can provide the same effects as the first embodiment.

Twelfth Detailed Representative Embodiment

Figure 35:
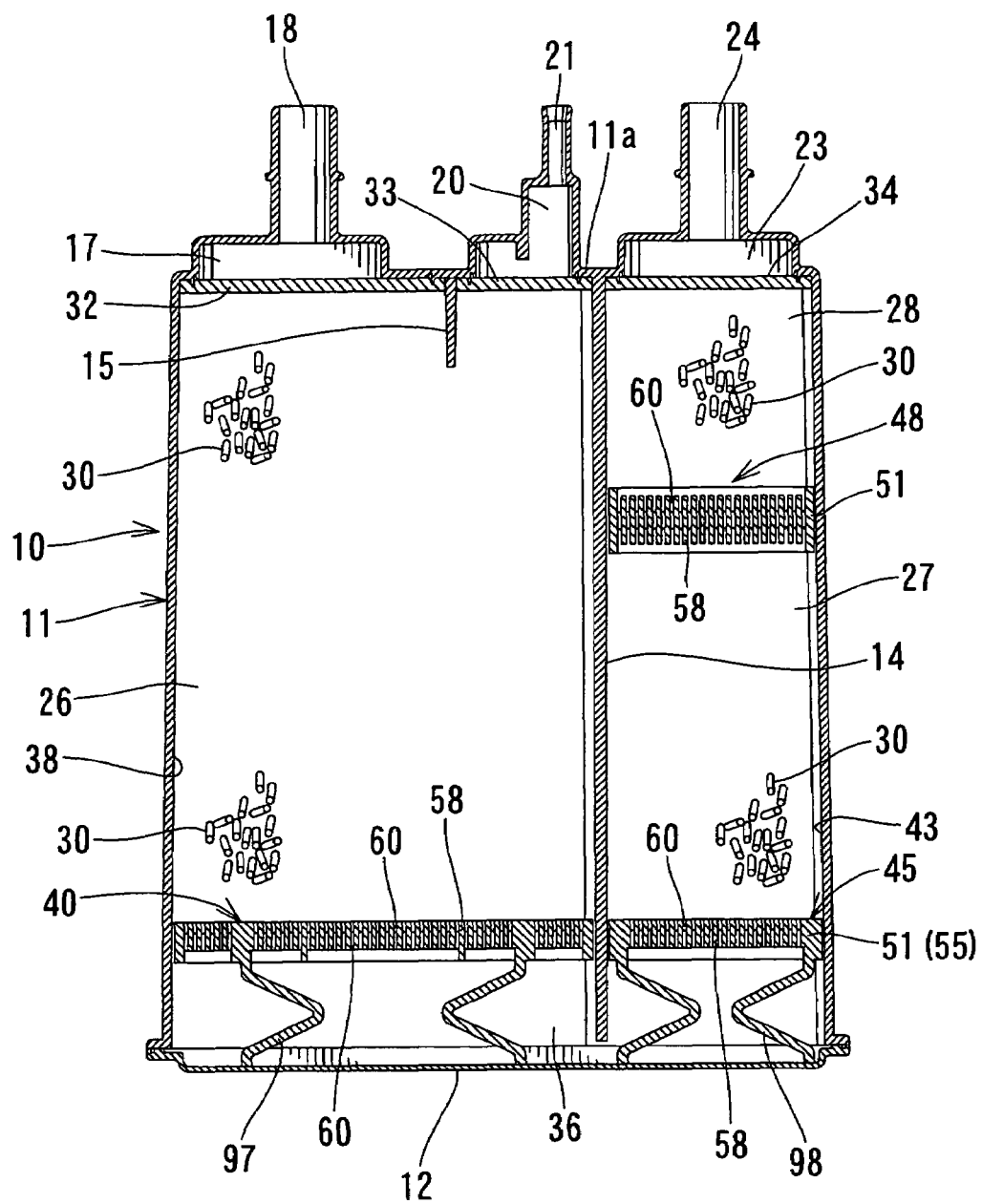
FIG. 35 is a sectional view of a canister according to a twelfth embodiment of the present invention.
Figure 36:
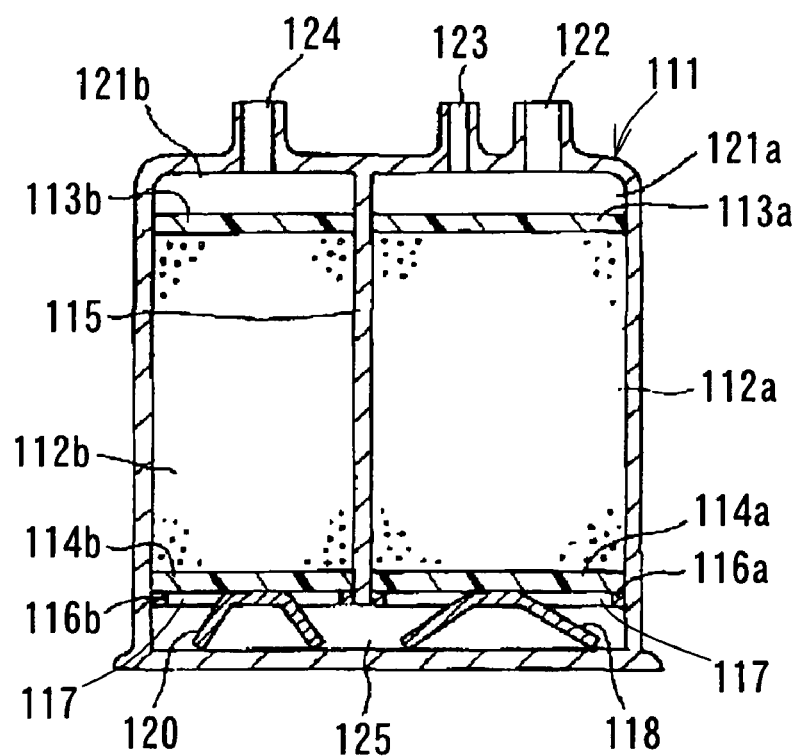
FIG. 36 is a vertical sectional view of a conventional canister.

A twelfth detailed representative embodiment of the present invention is shown in FIG. 35.

Because the twelfth embodiment relates to the first embodiment, only constructions and elements that are different from the first embodiment will be explained in detail. Elements that are the same in the first and twelfth embodiments will be identified by the same reference numerals and detailed description of such elements will be omitted.

As shown in FIG. 35, in this embodiment, instead of the springs 41 and 46 of the first embodiment, bellows-shaped resilient deformable members (elastic members) 97 and 98 are used. The resilient deformable members 97 and 98 are integrally formed with the pressing plates 40 and 45. Preferably, the elastic deformable portions 97 and 98 are respectively formed in the spring receiving portions 55 of the pressing plates 40 and 45.

This embodiment can provide the same effects as the first embodiment.

Further, because the resilient deformable portions 97 and 98 are integrally formed with the pressing plates 40 and 45, the number of the construction elements can be effectively reduced than the conventional canister.

Various changes and modifications may be made to the representative embodiments without departing from the scope of the present invention. For example, although three adsorbent layers (i.e., the first to three adsorbent layers 26, 27 and 28) are used in the embodiments, one, two or four or more adsorbent layers can be used, if desired.

Further, the number of the dividing members (i.e., the pressing plates 40 and 45 and the buffer plate 48) is not limited to the representative embodiments. Further, it is not necessary that the ventilating holes of the dividing members may have a uniform opening length and a uniform opening width over an entire thickness of the dividing members. Further, the activated carbon granules as the adsorbent materials 30 may have various shapes other than cylindrical shape. In addition, the dividing members can be used as the filters 32, 33 and 34 (FIG. 1). Moreover, the case 10 can be horizontally positioned.

What is claimed is:

1. A canister, comprising:
    a container containing granules of adsorbent materials that can adsorb fuel vapor generated from a fuel tank; and
    a plate-shaped dividing member that is disposed in the container in order to carry the granules of adsorbent materials,
    wherein the dividing member is formed with a large number of elongated ventilating holes for flowing the fuel vapor, and
    wherein each of the ventilating holes has an opening length larger than a length of individual granules of the adsorbent material and an opening width that can restrict passage of the granules of adsorbent materials.

2. A canister as defined in claim 1, wherein the dividing member has protrusions that are formed in its surface that faces the adsorbent materials, so that at least a part of the adsorbent materials can be spaced away from openings of the ventilating holes.

3. A canister as defined in claim 2, wherein the protrusions are positioned so as to have a clearance that can restrict passage of the adsorbent materials.

4. A canister as defined in claim 1, wherein the dividing member is provided with a cushion member that can contact the adsorbent materials.

5. A canister as defined in claim 1, wherein the ventilating holes of the dividing member are defined by a plurality of rib-shaped portions that are positioned in parallel at intervals that can restrict passage of the adsorbent materials.

6. A canister as defined in claim 5, wherein the rib-shaped portions have concave portions and convex portions that are formed in its end that faces the adsorbent materials.

7. A canister as defined in claim 2, wherein each of the protrusions has a notched corner portion that continuous with at least one of the corner portions of the ventilating holes.

8. A canister as defined in claim 2, wherein the protrusions are formed between the ventilating holes and having a cylindrical shape.

9. A canister as defined in claim 1 wherein the dividing member is circumferentially formed with a contact member that is arranged and constructed to elastically contact an inner wall surface of the container that receives the dividing member therein.

10. A canister as defined in claim 1, wherein the dividing member is a buffer plate that is positioned between two adjacent adsorbent layers.

11. A canister as defined in claim 1, wherein the dividing member is a pressing plate that is pressed against an adsorbent layer by a spring force of an elastic member.

12. A canister as defined in claim 11, wherein the elastic member is a gas permeable resilient member.

13. A canister as defined in claim 11, wherein the elastic member is integrally formed with the dividing member.

14. A canister, comprising:
a container containing granules of adsorbent materials that can adsorb fuel vapor generated from a fuel tank; and
a plate-shaped dividing member that is disposed in the container in order to carry the granules of adsorbent materials,
wherein the dividing member is formed with a large number of elongated ventilating holes for flowing the fuel vapor,
wherein each of the ventilating holes has an opening width that can restrict passage of the granules of adsorbent materials, and
wherein the dividing member has recessed portions that are formed in its surface that faces the adsorbent materials, so as to communicate between openings of the ventilating holes.

15. A canister as defined in claim 14, wherein the dividing member has protrusions that are formed in its surface that faces the adsorbent materials, so that at least a part of the adsorbent materials can be spaced away from openings of the ventilating holes.

16. A canister as defined in claim 15, wherein the protrusions are positioned so as to have a clearance that can restrict passage of the adsorbent materials.

17. A canister as defined in claim 14, wherein the dividing member is provided with a cushion member that can contact the adsorbent materials.

18. A canister as defined in claim 14, wherein the ventilating holes of the dividing member are defined by a plurality of rib-shaped portions that are positioned in parallel at intervals that can restrict passage of the adsorbent materials.

19. A canister as defined in claim 18, wherein the rib-shaped portions have concave portions and convex portions that are formed in its end that faces the adsorbent materials.

20. A canister as defined in claim 15, wherein each of the protrusions has a notched corner portion that continuous with at least one of the corner portions of the ventilating holes.

21. A canister as defined in claim 15, wherein the protrusions are formed between the ventilating holes and having a cylindrical shape.

22. A canister as defined in claim 14, wherein the dividing member is circumferentially formed with a contact member that is arranged and constructed to elastically contact an inner wall surface of the container that receives the dividing member therein.

23. A canister as defined in claim 14, wherein the dividing member is a buffer plate that is positioned between two adjacent adsorbent layers.

24. A canister as defined in claim 14, wherein the dividing member is a pressing plate that is pressed against an adsorbent layer by a spring force of an elastic member.

25. A canister as defined in claim 24, wherein the elastic member is a gas permeable resilient member.

26. A canister as defined in claim 24, wherein the elastic member is integrally formed with the dividing member.

* * * * *